US011825193B2

(12) United States Patent
Tomizawa et al.

(10) Patent No.: US 11,825,193 B2
(45) Date of Patent: Nov. 21, 2023

(54) ELECTRONIC APPARATUS, CONTROL METHOD, AND NON-TRANSITORY COMPUTER READABLE MEDIUM

(71) Applicant: CANON KABUSHIKI KAISHA, Tokyo (JP)

(72) Inventors: Satsuki Tomizawa, Kanagawa (JP); Toshimichi Ise, Kanagawa (JP); Ippei Uchida, Tokyo (JP); Takashi Hasegawa, Tokyo (JP); Miho Konta, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/872,699

(22) Filed: Jul. 25, 2022

(65) Prior Publication Data

US 2023/0036096 A1    Feb. 2, 2023

(30) Foreign Application Priority Data

Jul. 30, 2021  (JP) ................. 2021-126200

(51) Int. Cl.
  *H04N 23/65*   (2023.01)
  *H04N 23/63*   (2023.01)
  *H04N 23/667*  (2023.01)
(52) U.S. Cl.
  CPC ......... *H04N 23/651* (2023.01); *H04N 23/633* (2023.01); *H04N 23/667* (2023.01)
(58) Field of Classification Search
  None
  See application file for complete search history.

(56) References Cited

U.S. PATENT DOCUMENTS

| | | | | |
|---|---|---|---|---|
| 9,329,624 | B2* | 5/2016 | Kimura | G06F 1/3206 |
| 2013/0135509 | A1* | 5/2013 | Fuji | H04N 23/631 |
| | | | | 348/333.02 |
| 2019/0149743 | A1* | 5/2019 | Toyoda | H04N 23/667 |
| | | | | 348/372 |
| 2020/0322543 | A1* | 10/2020 | Onda | H04N 23/651 |
| 2023/0037190 | A1* | 2/2023 | Ise | H04N 23/634 |

FOREIGN PATENT DOCUMENTS

| | | |
|---|---|---|
| JP | 2000-350371 A | 12/2000 |
| JP | 2005-293519 A | 10/2005 |
| JP | 2008-187234 A | 8/2008 |
| JP | 2016-103748 A | 6/2016 |

* cited by examiner

*Primary Examiner* — Cynthia Segura
(74) *Attorney, Agent, or Firm* — Cowan, Liebowitz & Latman, P.C.

(57) ABSTRACT

An electronic apparatus includes a reception unit configured to receive an instruction from a user; a control unit configured to perform control to set an operating mode of the electronic apparatus to any of a plurality of operating modes including a first mode and a second mode having maximum power consumption lower than maximum power consumption of the first mode according to the instruction from the user, wherein part of a plurality of functions of the electronic apparatus that are available in the first mode are unavailable in the second mode; and a notification unit configured to notify the user of functions unavailable in the second mode among the plurality of functions available in the first mode according to a reception of the instruction to set the operating mode of the electronic apparatus from the user.

15 Claims, 15 Drawing Sheets

ELECTRONIC APPARATUS, CONTROL METHOD, AND NON-TRANSITORY COMPUTER READABLE MEDIUM

BACKGROUND OF THE INVENTION

Field of the Invention

The present disclosure relates to an electronic apparatus, a control method, and a non-transitory computer readable medium.

Description of the Related Art

Japanese Patent Application Laid-open No. 2008-187234 describes a method for calculating a used power amount corresponding to the use of an electronic apparatus and displaying the number of photographable sheets on the basis of the total capacity of a battery and the used power amount. Japanese Patent Application Laid-open No. 2005-293519 describes a method for changing a function to be executed to a function having lower power consumption according to the priority of respective functions and a battery state.

In some cases, the minimum operating voltages (hereinafter called the reference voltages) of batteries are increased according to the maximum power consumption of electronic apparatuses. The increase in the reference voltages of the batteries leads to an increase in the maximum power supply of the batteries. As a result, it is possible to cover the maximum power consumption of the electronic apparatuses, which has been on the rise in recent years, by the power of the batteries. The electronic apparatuses end their driving when battery voltages drop to the reference voltages.

Accordingly, when the reference voltages are increased, the usable times of the electronic apparatuses are shortened. Users are allowed to extend the usable times by switching to a power mode in which available functions are made unavailable to suppress power consumption. However, the users have a difficulty in knowing which functions become unavailable after the switching of a power mode.

SUMMARY OF THE INVENTION

The present disclosure has been made in view of the above problem and allows a user to easily know functions that become unavailable after the switching of a power mode (operating mode).

A first aspect of the present disclosure provides an electronic apparatus including: at least one processor; and at least one memory storing a program which, when executed by the at least one processor, causes the electronic apparatus to function as: a reception unit configured to receive an instruction from a user; a control unit configured to perform control to set an operating mode of the electronic apparatus to any of a plurality of operating modes including a first mode and a second mode having maximum power consumption lower than maximum power consumption of the first mode according to the instruction from the user, wherein part of a plurality of functions of the electronic apparatus that are available in the first mode are unavailable in the second mode; and a notification unit configured to notify the user of functions unavailable in the second mode among the plurality of functions available in the first mode according to a reception of the instruction to set the operating mode of the electronic apparatus from the user.

A second aspect of the present disclosure provides a control method for controlling an electronic apparatus, the method comprising: receiving an instruction from a user; performing control to set an operating mode of the electronic apparatus to any of a plurality of operating modes including a first mode and a second mode having maximum power consumption lower than maximum power consumption of the first mode according to the instruction from the user, wherein part of a plurality of functions of the electronic apparatus that are available in the first mode are unavailable in the second mode; and notifying the user of functions unavailable in the second mode among the plurality of functions available in the first mode according to a reception of the instruction to set the operating mode of the electronic apparatus from the user.

A third aspect of the present disclosure provides a non-transitory computer readable medium that stores a program, wherein the program causes a computer to execute a control method of the electronic apparatus, the control method comprising: receiving an instruction from a user; performing control to set an operating mode of the electronic apparatus to any of a plurality of operating modes including a first mode and a second mode having maximum power consumption lower than maximum power consumption of the first mode according to the instruction from the user, wherein part of a plurality of functions of the electronic apparatus that are available in the first mode are unavailable in the second mode; and notifying the user of functions unavailable in the second mode among the plurality of functions available in the first mode according to a reception of the instruction to set the operating mode of the electronic apparatus from the user.

Further features of the present invention will become apparent from the following description of exemplary embodiments with reference to the attached drawings.

DESCRIPTION OF THE EMBODIMENTS

First Embodiment

Hereinafter, an embodiment of the present disclosure will be described with reference to the drawings. An electronic apparatus according to the present disclosure may only be, for example, an electronic apparatus such as a digital video camera, a digital still camera, a smart phone, and a personal computer that operates with an electrical battery (hereinafter called a battery).

The power consumption of electronic apparatuses such as cameras has been on the increase due to the influence of the addition of new functions or the like. Meanwhile, it has been demanded that the batteries of the cameras be reduced in size and weight and be optimized in development cost. Therefore, newly-developed batteries are not necessarily optimum, and conventional products have been generally used in many cases. When the conventional batteries are used, the maximum power supply of the batteries may fall below the maximum power consumption of the cameras. In order to prevent the maximum power supply of the batteries from falling below the maximum power consumption of the cameras, the minimum operating voltages (reference voltages) of the batteries are increased. The increase in the reference voltages of the batteries leads to an increase in the maximum power supply of the batteries. As a result, it is possible to cover the maximum power consumption of the electronic apparatuses by the power of the batteries.

Figure 3:
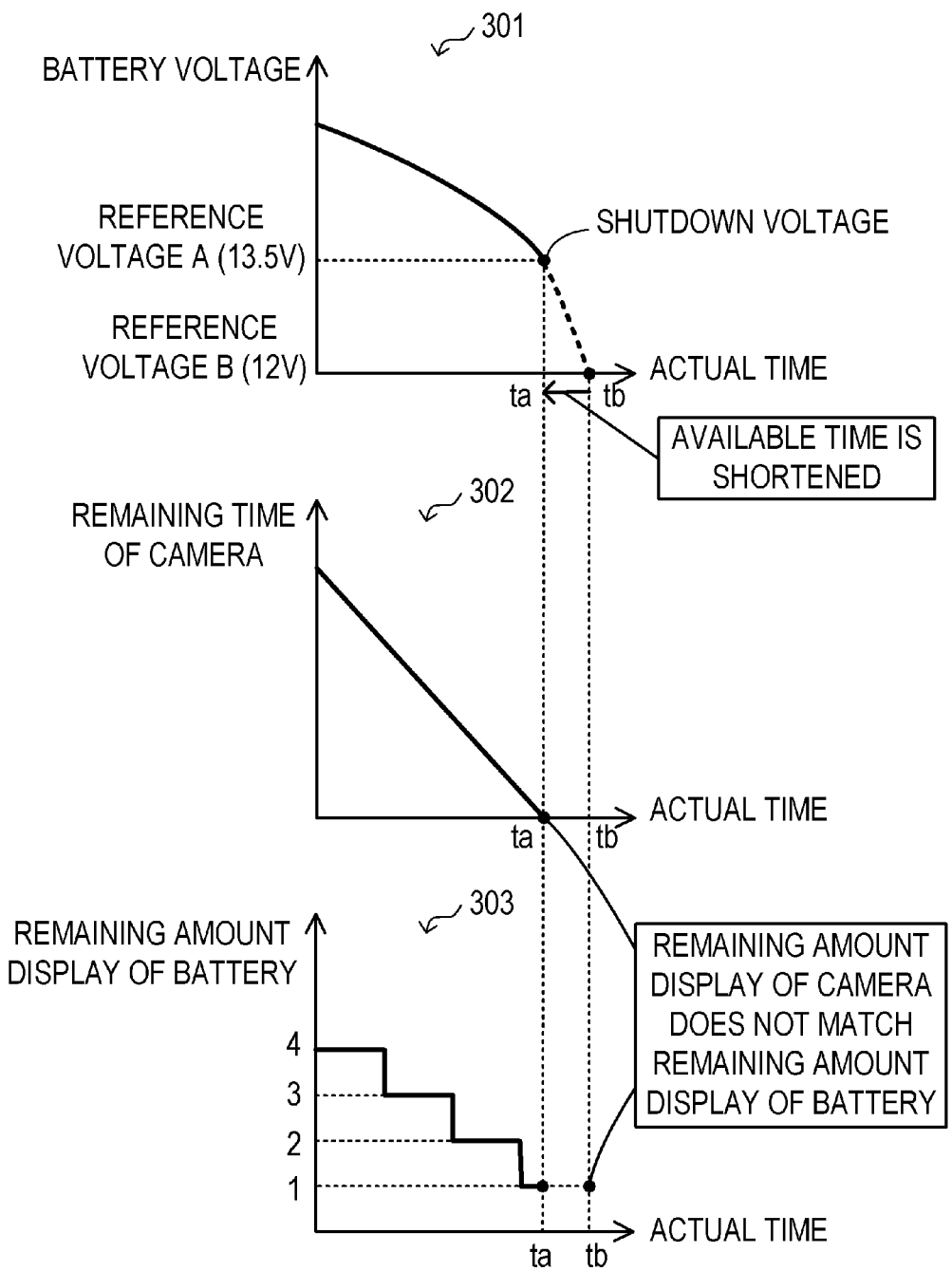
FIG. 3 is a diagram for describing an adverse effect caused when a reference voltage is increased.

Using FIG. 3, the states of a camera and a battery when the reference voltage of the battery that supplies power to the camera is increased will be described. In FIG. 3, a graph 301 is a graph showing a change in a battery voltage relative to the actual operating time (actual time) of the camera. A vertical axis shows the battery voltage, and a horizontal axis shows the actual time. The remaining usable time (hereinafter also called the remaining time) of the camera is calculated so as to become zero when the battery voltage drops to the reference voltage. When the remaining time of the camera becomes zero, the camera ends its driving (shuts down).

When the reference voltage is increased from a reference voltage B (12 V) to a reference voltage A (13.5 V) to cover maximum power consumption, the remaining time of the camera becomes zero when the battery voltage drops to the reference voltage A. Therefore, the remaining time becomes zero at a time ta, and the camera shuts down. With the reference voltage B, the camera shuts down at a time tb. Therefore, when the reference voltage is increased to the reference voltage A, the usable time of the camera is shortened by tb−ta.

In FIG. 3, a graph 302 is a graph showing the duration of usable time (remaining time) of the camera relative to the actual operating time (actual time) of the camera. A vertical axis shows the remaining time of the camera, and a horizontal axis shows the actual time. When the reference voltage of the battery is increased from the reference voltage B to the reference voltage A, the remaining time of the camera is calculated so as to become zero at the time ta.

In FIG. 3, a graph 303 is a graph showing the remaining amount display of the battery relative to the actual operating time (actual time) of the camera. A vertical axis shows the remaining amount display of the battery, and a horizontal axis shows the actual time. The remaining amount of the battery is displayed on a display unit provided in the battery itself in some cases. The remaining amount of the battery is displayed through, for example, a mark, a lamp, an LED display, or the like. In the example of the graph 303, the remaining amount of the battery is displayed at the four levels of 1 to 4.

Even when the reference voltage is increased to the reference voltage A, the remaining amount display of the battery is set on the basis of the time tb at which the battery voltage becomes the reference voltage B. On the other hand, when the reference voltage is increased to the reference voltage A, the remaining time of the camera is calculated on the basis of the reference voltage A. Accordingly, the remaining amount display of the battery does not match the remaining amount display displayed on the camera (the remaining amount display corresponding to the remaining time of the camera).

When the reference voltage of a battery used in an electronic apparatus such as a camera is increased as described in FIG. 3, the shortening of the usable time of the electronic apparatus and the mismatch between the remaining amount display of the battery and the remaining amount display of the electronic apparatus may occur. In the first embodiment, an electronic apparatus switches a calculation method for calculating a remaining time according to power consumption to make it possible to appropriately calculate the remaining time and reduce the mismatch between the remaining amount display of a battery and the remaining amount display of the electronic apparatus.

Figure 1:
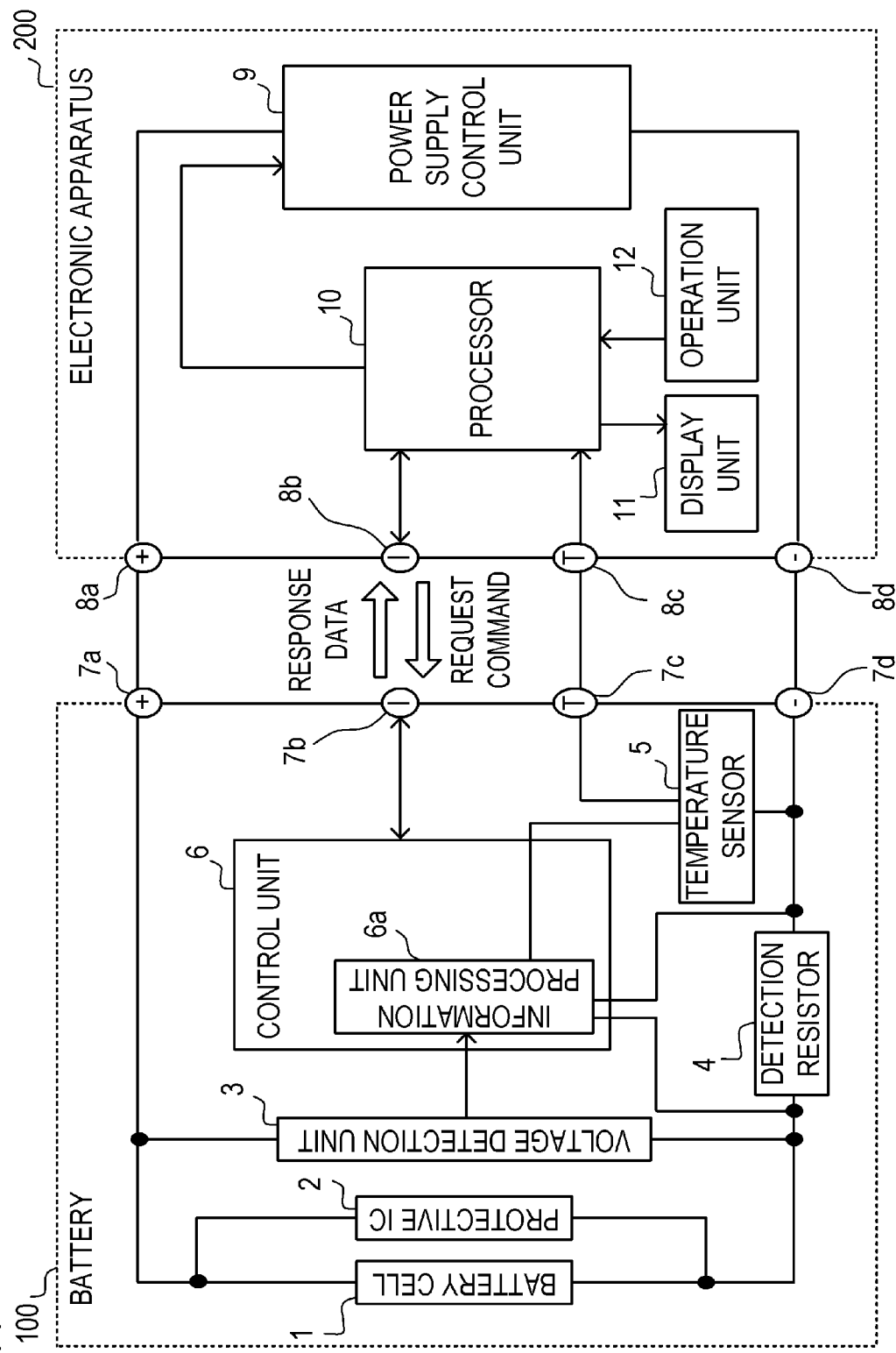
FIG. 1 is a block diagram for describing the configurations of a battery 100 and an electronic apparatus 200 in a first embodiment.

FIG. 1 is a block diagram showing a configuration example of a battery 100 and an electronic apparatus 200 in the first embodiment. The battery 100 and the electronic apparatus 200 are connected to each other when contacts 7a to 7d of the battery 100 are connected to contacts 8a to 8d of the electronic apparatus 200, respectively. The battery 100 supplies power to the electronic apparatus 200 via the contacts 7a, 8a, 7d, and 8d.

Configurations provided in the battery 100 will be described. A battery cell 1 is a charging-type battery cell and generates an electromotive force. A protective IC (Integrated Circuit) 2 is a circuit that controls the protective function of the battery cell 1 during charging and discharging. A voltage detection unit 3 detects a voltage (battery voltage) between the terminals of the battery cell 1. A detection resistor 4 detects a discharging current (battery current). A temperature sensor 5 detects a battery temperature. The temperature sensor 5 is, for example, a thermistor or a thermocouple.

An information processing unit 6a inside a control unit 6 acquires information detected by the voltage detection unit 3, the detection resistor 4, and the temperature sensor 5 and performs the A/D conversion of the acquired information. The information processing unit 6a performs processing to integrate currents since the start of use on the basis of the values of acquired voltages or currents. The battery 100 may be equipped with an LED display unit (not shown) that shows the remaining amount of the battery. The remaining amount display of the battery 100 is controlled by the control unit 6. Besides the remaining amount display of the electronic apparatus 200, the battery 100 is able to display the remaining amount of the battery 100 on the LED display unit.

Configurations provided in the electronic apparatus 200 will be described. A power supply control unit 9 generates a voltage used in the electronic apparatus 200 from a power supply supplied from the battery 100 and supplies power to the constituting elements of the electronic apparatus 200. The power supply control unit 9 is, for example, a circuit including a DC/DC converter or a linear regulator.

A processor 10 controls the respective constituting elements of the electronic apparatus 200. The processor 10 communicates with the battery 100 via the contacts 8b and 7b and transmits a request command to the control unit 6. The processor 10 receives remaining amount information on the battery 100 including a battery remaining amount (remaining capacity), a battery voltage, a battery current, or the like as response data via the contacts 7b and 8b. The processor 10 acquires the remaining usable time of the electronic apparatus 200 using the remaining amount information from the battery 100. Further, the processor 10 receives information on the battery temperature of the battery 100 from the temperature sensor 5 via the contacts 7c and 8c.

A display unit 11 displays information on the electronic apparatus 200 such as a remaining time, moving image data, or the like. The display unit 11 is, for example, a liquid crystal display. An operation unit 12 receives an operation from a user. The operation unit 12 is, for example, a switch or a button and may be a touch panel integrated with the display unit 11. The processor 10 controls the constituting elements of the electronic apparatus 200 according to input information from the operation unit 12.

Figure 2:
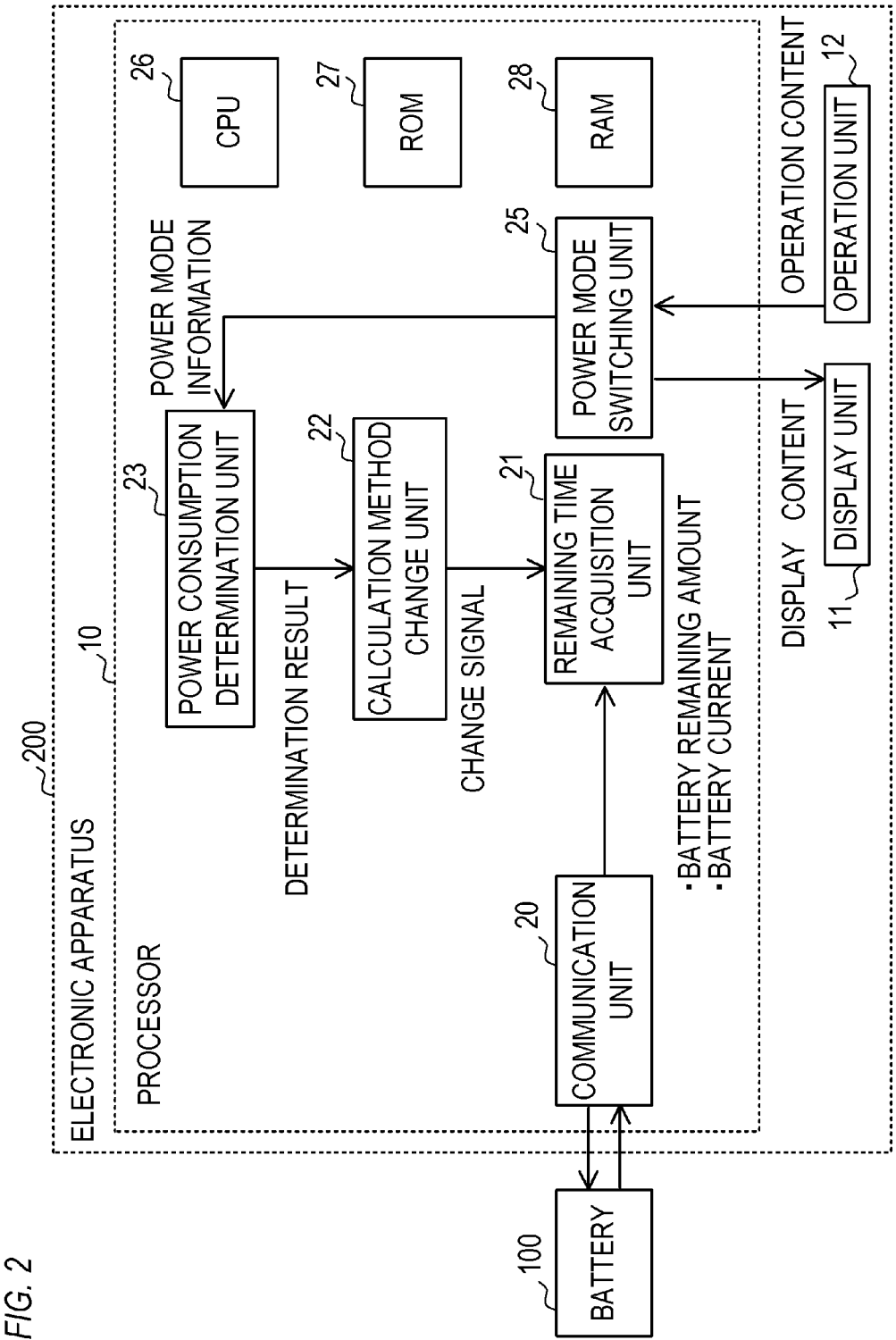
FIG. 2 is a block diagram for describing some of the configurations of the electronic apparatus 200 in the first embodiment.

FIG. 2 is a block diagram showing a configuration example of the electronic apparatus 200 in the first embodiment. FIG. 2 is a diagram describing in detail the processor 10 among the respective configurations of the electronic apparatus 200 shown in FIG. 1. A CPU 26 provided in the processor 10 is responsible for controlling the respective blocks of the processor 10 via a bus not shown. A ROM 27 stores a program that is executed by the CPU 26. A partial area of the ROM 27 is used as a backup to maintain the state of the electronic apparatus 200 or the like. A RAM 28 is a volatile memory that is used as temporary storage of the CPU 26.

The CPU 26 executes a program that is read from the ROM 27 or a recording medium serving as a non-volatile memory into the RAM 28 to cause the electronic apparatus 200 to realize the functions of a communication unit 20, a remaining time acquisition unit 21, a calculation method change unit 22, a power consumption determination unit 23, and a power mode switching unit 25. Further, the CPU 26 performs control so that the electronic apparatus 200 ends its operation when the remaining time of the electronic apparatus 200 becomes zero. The communication unit 20 receives remaining amount information on the battery 100 including a battery remaining amount and a battery current through communication with the battery 100.

The remaining time acquisition unit 21 acquires the remaining time of the electronic apparatus 200 on the basis of information on a battery remaining amount and information on a battery current that are acquired from the battery 100. A calculation method for calculating the remaining time by the remaining time acquisition unit 21 is determined on the basis of information from the calculation method change unit 22. The acquired remaining time of the electronic apparatus 200 is output to and displayed on the display unit 11 via a signal line.

The calculation method change unit 22 determines a calculation method for calculating a remaining time on the basis of the determination result of the power consumption of the electronic apparatus 200 that is output from the power consumption determination unit 23. The calculation method change unit 22 outputs information on the determined calculation method for calculating the remaining time to the remaining time acquisition unit 21.

The power consumption determination unit 23 determines the power consumption of the electronic apparatus 200. The power consumption determination unit 23 is able to determine the power consumption on the basis of power mode information from the power mode switching unit 25. The electronic apparatus 200 has a plurality of power modes having different maximum power consumption. Since available functions are different between the respective power modes, the maximum power consumption in the respective power modes is acquired on the basis of the functions available in the respective modes. The power consumption determination unit 23 outputs the determination result of the power consumption of the electronic apparatus 200 to the calculation method change unit 22.

Note that the power consumption determination unit 23 may determine the power modes according to other methods. For example, the power consumption determination unit 23 calculates the power consumption of the electronic apparatus 200 from the product of a battery voltage and a battery current that are acquired from the battery 100 via the communication unit 20. Then, the power consumption determination unit 23 may compare the calculated power consumption with a power consumption table stored in advance in the ROM 27 to determine a present power mode. Note that the power consumption table is a table showing the corresponding relationship between the power consumption and the power modes of the electronic apparatus 200.

The power mode switching unit 25 receives a signal showing an operation content for switching a power mode from the operation unit 12 and switches the power mode on the basis of the received signal. For example, when the display unit 11 displays the respective power modes of the electronic apparatus 200 and a user selects a desired power mode via the operation unit 12, an operation content is transmitted to the power mode switching unit 25. The power mode switching unit 25 switches a power mode on the basis of a user's operation and outputs information on a switched power mode to the power consumption determination unit 23.

Note that the display unit 11 may display, instead of respective power mode names, a user interface for causing the user to select the ON and OFF of a power saving mode. When the power saving mode is set to be turned ON from OFF by the user, the power mode switching unit 25 outputs information showing that a switched power mode is the power saving mode to the power consumption determination unit 23.

Figure 4:
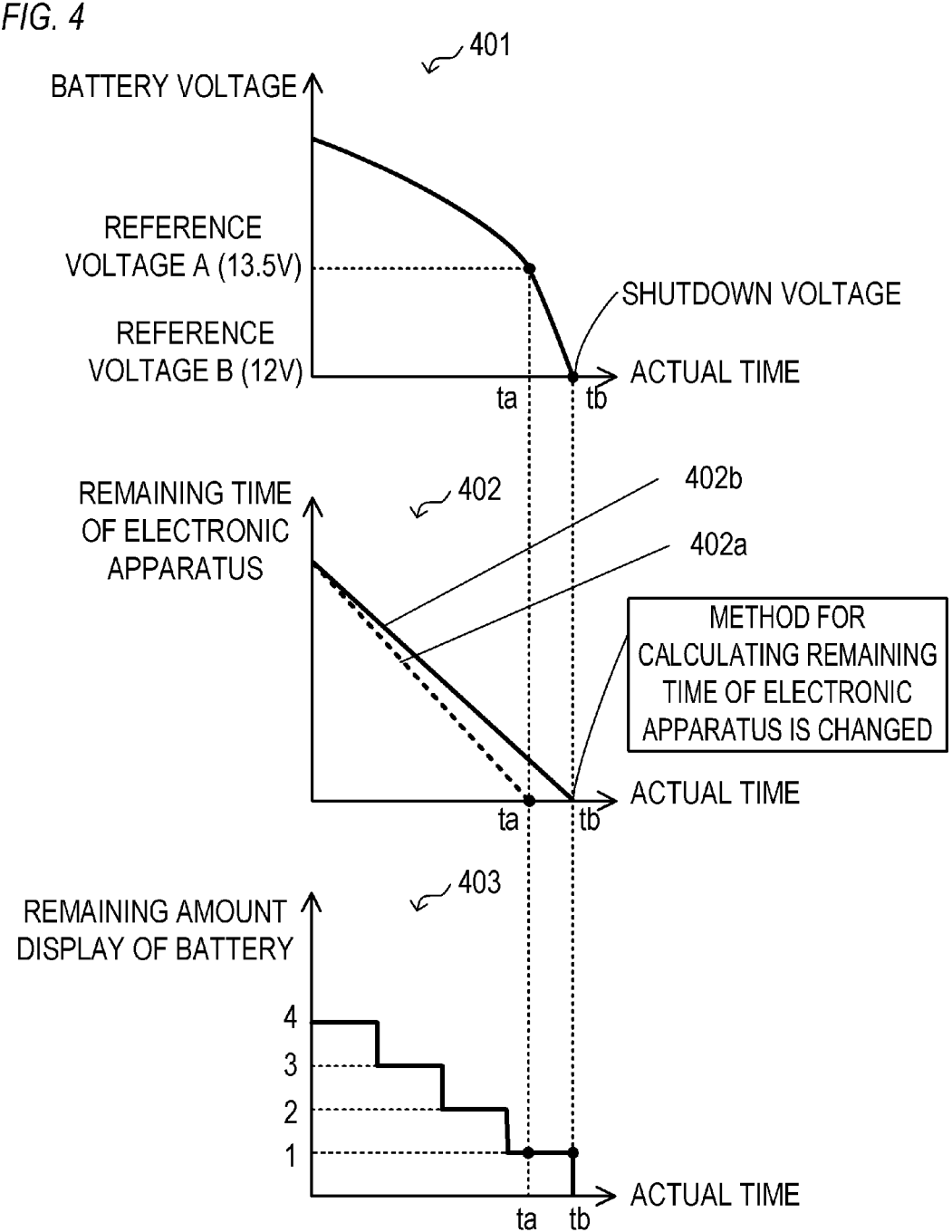
FIG. 4 is a diagram for describing a method for switching a calculation formula for the remaining amount display of the electronic apparatus 200 in the first embodiment.

A change in the calculation method for calculating the remaining time of the electronic apparatus 200 will be described with reference to FIG. 4. In FIG. 4, a graph 401 is a graph showing a change in a battery voltage relative to the actual operating time (actual time) of the electronic apparatus 200. A vertical axis shows the battery voltage, and a horizontal axis shows the actual time.

When a reference voltage is increased to a reference voltage A (13.5 V) along with an increase in power consumption, the actual time of the electronic apparatus 200 is shortened to ta as shown in FIG. 3. In the power saving mode, the electronic apparatus 200 restricts available functions to reduce its power consumption. The reduction in the power consumption of the electronic apparatus 200 allows a reduction in the reference voltage of the electronic apparatus 200. In the power saving mode, the electronic apparatus 200 sets the reference voltage at a reference voltage B (12 V) to comply with the power saving mode and determines the calculation method for calculating the remaining time as follows. Accordingly, the remaining time is calculated so as to become zero when the battery voltage drops to the reference voltage B, and the electronic apparatus 200 is allowed to delay its shutdown until the actual time becomes tb.

The electronic apparatus 200 has a plurality of power mode having different maximum power consumption and is allowed to change the reference voltage according to the power consumption of the respective power modes. The maximum power consumption of the respective power modes is different depending on functions available in the respective power modes. The power modes of the electronic apparatus 200 include, for example, a normal mode and the power saving mode having maximum power consumption smaller than that of the normal mode. The power saving mode refers to an operating state in which the available functions are restricted to reduce the maximum power consumption of the electronic apparatus 200 in comparison with the normal mode. A user is only required to turn on the power saving mode when he/she wants to increase the remaining time of the electronic apparatus 200. The normal mode corresponds to a "first power mode," and the power saving mode corresponds to a "second power mode".

In the power saving mode, some of the functions of the electronic apparatus 200 are disabled. In the power saving mode, at least one of the functions available in the normal mode may be disabled. For example, the electronic apparatus 200 disables functions such as the high brightness setting of the backlight of the display unit and a network function in the power saving mode. Further, the processing contents of the respective functions of the electronic apparatus 200 may be changed to reduce the processing load of the processor 10 in the power saving mode. When the electronic apparatus 200 operates in the normal mode, the user is allowed to increase the remaining time of the electronic apparatus 200 by turning on the power saving mode.

The calculation method for calculating the usable time (remaining time) of the electronic apparatus 200 will be described with reference to a graph 402 in FIG. 4. The graph 402 is a graph showing the remaining time of the electronic apparatus 200 relative to the actual operating time (actual time) of the electronic apparatus 200. A vertical axis shows the remaining time of the electronic apparatus 200, and a horizontal axis shows the actual time. The electronic apparatus 200 changes the calculation method according to a present power mode to calculate the remaining time of the electronic apparatus 200.

The power consumption determination unit 23 determines the maximum power consumption of the electronic apparatus 200 in a present power mode on the basis of power mode information received from the power mode switching unit 25. The calculation method change unit 22 determines the calculation method for calculating the remaining time of the electronic apparatus 200 on the basis of the determination result of the power consumption determination unit 23.

The calculation method change unit 22 determines a coefficient (hereinafter called a correction coefficient) used to calculate the remaining time of the electronic apparatus 200 according to power consumption in the present power mode. The correction coefficient is a coefficient used to correct the remaining time so that the remaining time of the electronic apparatus 200 becomes zero when the voltage of the battery 100 drops to a reference voltage. By the determination of the correction coefficient based on the present power mode of the electronic apparatus 200, the remaining time before the voltage of the battery 100 drops to the reference voltage corresponding to the present power mode is acquired. The calculation method change unit 22 is allowed to output information showing the determined correction coefficient to, for example, the remaining time acquisition unit 21.

When the correction coefficient in the normal mode is k1 and the correction coefficient in the power saving mode is k2, the remaining time acquisition unit 21 is able to calculate the remaining time of the electronic apparatus 200 according to the following Formulae (Formula 1) and (Formula 2).

$$T=\{C\times k1/I\}\times 60 \qquad \text{(Formula 1)}$$

$$T=\{C\times k2/I\}\times 60 \qquad \text{(Formula 2)}$$

T represents the remaining time [minute] of the electronic apparatus 200. C represents a battery remaining amount [mAh]. I represents a battery current [mA]. The battery remaining amount and the battery current are acquired from the battery 100 as remaining amount information.

As described above, the reference voltage corresponding to the normal mode is set according to the maximum power consumption in the normal mode, and the reference voltage corresponding to the power saving mode is set according to the maximum power consumption in the power saving mode. Further, the value of the correction coefficient k1 is a value considering the reference voltage corresponding to the normal mode, and the value of the correction coefficient k2 is a value considering the reference voltage corresponding to the power saving mode.

In a graph 402, a graph 402a shown by dotted lines is a graph of the remaining time when the correction coefficient k1 is used, and the remaining time becomes zero at an actual time ta. A graph 402b shown by a solid line is a graph of the remaining time when the correction coefficient k2 is used, and the remaining time becomes zero at an actual time tb.

In FIG. 4, a graph 403 is a graph showing the remaining amount display of the battery relative to the actual operating time (actual time) of the electronic apparatus 200 like the graph 303 in FIG. 3. A vertical axis shows the remaining amount display of the battery, and a horizontal axis shows the actual time. Since the electronic apparatus 200 changes the calculation method to (Formula 2) in the power saving mode, the remaining time becomes zero at the actual time tb as shown in the graph 402b. Accordingly, the mismatch between the remaining amount display of the battery and the remaining amount display of the electronic apparatus 200 is solved.

As described above, the correction coefficients used to calculate the remaining times are switched according to the power modes, whereby the remaining times adapted to the reference voltages corresponding to the power modes are calculated. Therefore, the electronic apparatus 200 is able to increase its remaining time in a power mode having small power consumption. Further, it is possible to make the display of the remaining time displayed on the electronic apparatus 200 match the display of the remaining amount of the battery 100.

Note that the number of the power modes of the electronic apparatus 200 is not limited to two but may be at least three. In the case of at least three power modes, the electronic apparatus 200 is allowed to acquire a remaining time corresponding to power consumption by changing a correction coefficient for each of the modes. Further, the values of the reference voltages corresponding to the respective power modes are given as an example and are only required to be set on the basis of power consumption in the respective power modes. Further, the power consumption in the respective power modes may be maximum power consumption in the power modes. Further, the correction coefficients are not necessarily changed on the basis of a present power mode but may be changed on the basis of the present power consumption of the electronic apparatus 200.

The electronic apparatus 200 is allowed to suppress the shortening of the usable time of the electronic apparatus 200 by changing the calculation method for calculating the remaining time of the electronic apparatus 200 according to the power modes or power consumption. Further, it is possible to reduce the mismatch between the remaining amount display of the battery and the remaining amount display of the electronic apparatus.

In the first embodiment, the electronic apparatus 200 notifies the user of information on functions unavailable in the power saving mode among functions available in the normal mode when switching from the normal mode to the power saving mode having maximum power consumption smaller than that of the normal mode. Note that unavailable functions will also be called functions set to be disabled or functions not set to be enabled in the following embodiments. Further, available functions will also be called functions set to be enabled. When switching to the power saving mode, the user is allowed to determine whether to switch a power mode after confirming functions unavailable after the switching.

Figure 9:
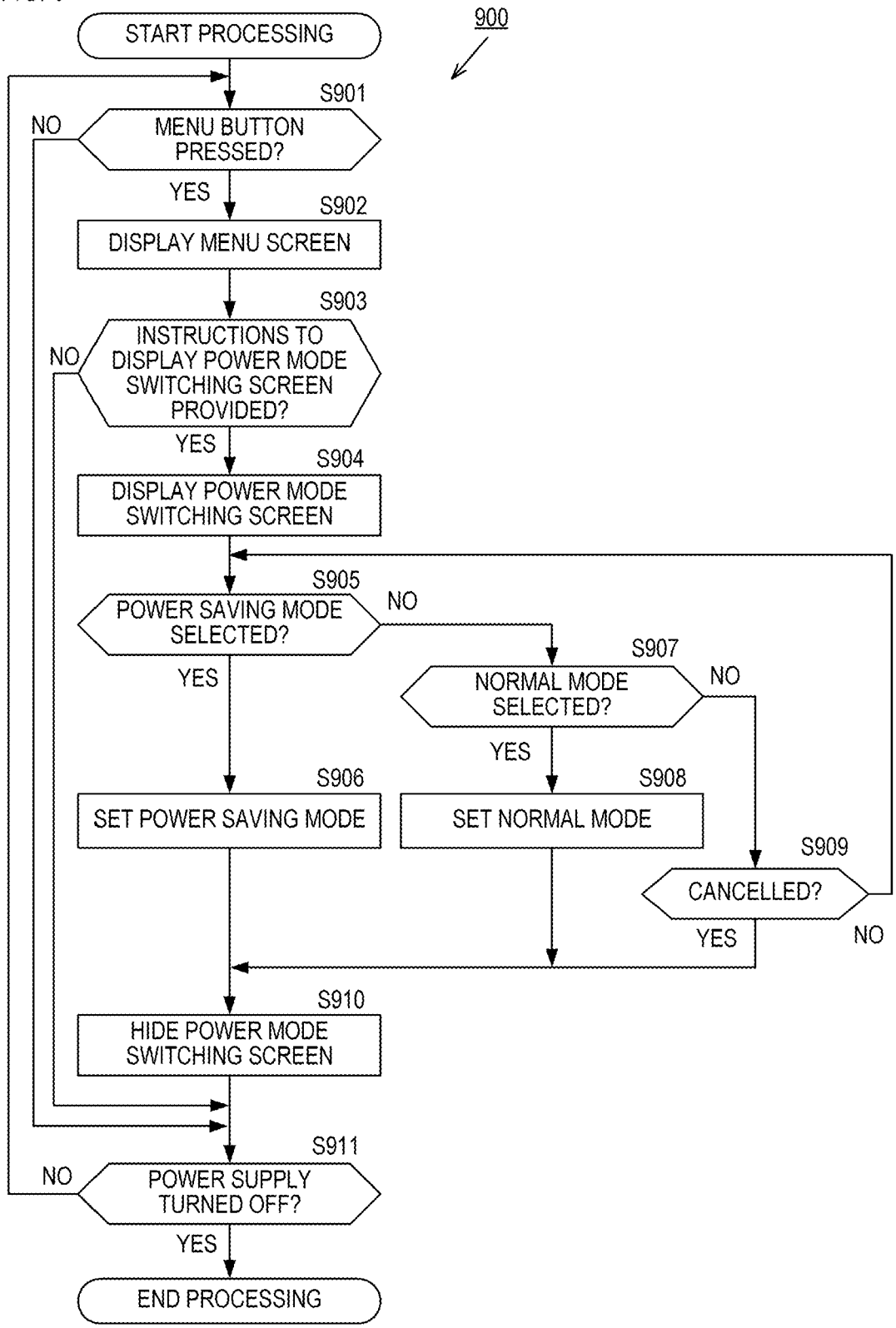
FIG. 9 is a flowchart for describing power mode switching processing 900 in the first embodiment.
Figure 10:
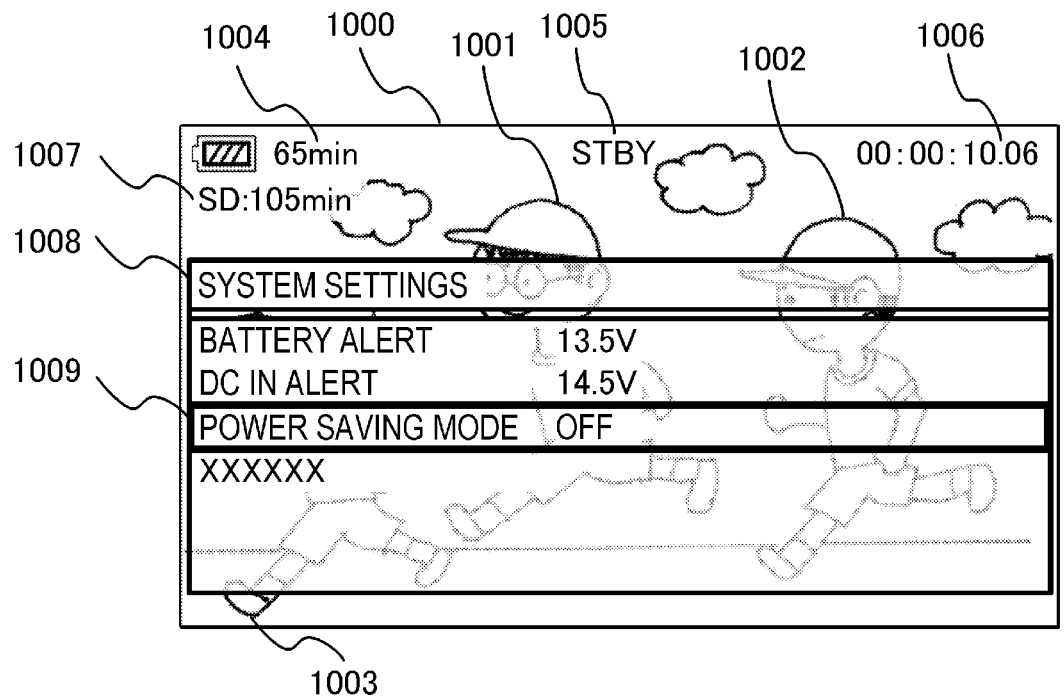
FIG. 10 is a diagram for describing a menu screen 1008 in the first embodiment.
Figure 11:
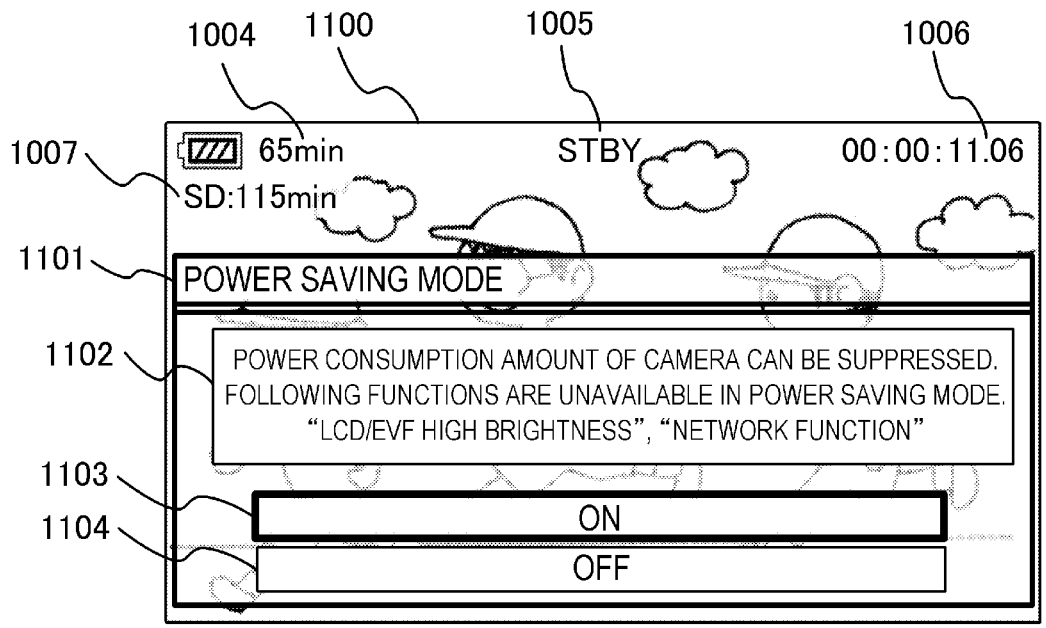
FIG. 11 is a diagram for describing a power mode switching screen 1101 in the first embodiment.

With reference to FIGS. 9 to 11, notification relating to the restriction of functions in switching a power mode will be described. FIG. 9 is a flowchart for describing power mode switching processing 900 in the first embodiment. The power mode switching processing 900 is processing executed when the CPU 26 detects an operation to switch a power mode with the operation unit 12. The power mode switching processing 900 starts in a state in which the electronic apparatus 200 is activated with power from the battery 100 supplied thereto.

In step S901, the CPU 26 determines whether the menu button of the operation unit 12 has been pressed. The CPU 26 proceeds to step S902 when the menu button has been pressed. The CPU 26 proceeds to step S911 when the menu button has not been pressed. Note that the determination in step S901 is only required to be a determination as to whether an operation to display a menu screen has been performed, and is not limited to a determination as to whether the menu button has been pressed. The CPU 26 may determine whether the operation to display the menu screen has been performed according to a touch operation on a touch panel.

In step S902, the CPU 26 displays the menu screen on the display unit 11. Here, a menu screen 1008 in the first embodiment will be described with reference to FIG. 10. FIG. 10 is a diagram for describing a display example of information at photographing that is displayed on the display unit 11.

On a photographing screen 1000, subjects 1001, 1002, and 1003 that represent an image being photographed are displayed. The CPU 26 develops the image including the subjects 1001 to 1003 captured by an imaging unit provided in the electronic apparatus 200 into the RAM 28 and displays the same on the display unit 11.

On the photographing screen 1000, a remaining time 1004, a recording status 1005, a photographing time code 1006, an SD card recordable time 1007, and the menu screen 1008 that have been acquired by the CPU 26 are displayed through an OSD (On-Screen Display). The data displayed through the OSD is developed into the RAM 28. The CPU 26 superimposes the OSD data onto an image acquired from the imaging unit to display the photographing screen 1000 on the display unit 11. FIG. 10 shows the information display example in a case in which the electronic apparatus 200 is a video camera. However, the electronic apparatus 200 is not limited to a video camera but may be a reproduction device or other electronic apparatus.

The menu screen 1008 is an example of a screen in which a menu item about "system settings" is displayed. A menu item 1009 is an item for switching between the power saving mode and the normal mode. When the user selects the menu item 1009, the electronic apparatus 200 displays a screen for switching a power mode. The user is allowed to execute the switching between the power saving mode and the normal mode on the displayed screen.

As described above, some of the functions of the electronic apparatus 200 are set to be disabled in the power saving mode. In the power saving mode, the user is not allowed to enable some functions. Therefore, the maximum power consumption of the electronic apparatus 200 reduces in the power saving mode. In the normal mode, the use of the functions of the electronic apparatus 200 that are unavailable in the power saving mode is allowed. Therefore, the maximum power consumption of the electronic apparatus 200 in the normal mode is greater than that of the electronic apparatus 200 in the power saving mode. Note that the electronic apparatus 200 may be configured to have a plurality of power saving modes having different disabled functions. In the following description, the electronic apparatus 200 has the two power modes of a normal mode and one power saving mode.

In the example of FIG. 10, the menu item 1009 displays the character string of the "power saving mode" as an item name, and displays "ON" when a present power mode is set to the normal mode and "OFF" when the present power mode is the power saving mode. The item name shows only an example here and may be other character string or expressed by an icon or the like other than a character string.

In step S903, the CPU 26 determines whether an instruction to display a power mode switching screen to switch a power mode have been provided. For example, the user is allowed to provide the instruction to display the power mode switching screen through the selection (touch) operation of the menu item 1009. The CPU 26 proceeds to step S904 when the instruction to display the power mode switching screen have been provided. The CPU 26 proceeds to step S911 when the instruction to display the power mode switching screen have not been provided.

In step S904, the CPU 26 displays the power mode switching screen on which the user switches the power mode to the power saving mode or the normal mode on the display unit 11. On the power mode switching screen, information on functions disabled when the normal mode is switched to the power saving mode is displayed. That is, the user is not allowed to set the functions displayed here to be enabled.

Here, the power mode switching screen in the first embodiment will be described with reference to FIG. 11. A power mode switching screen 1101 is a screen on which the user selects the normal mode or the power saving mode. FIG. 11 shows an example of the power mode switching screen 1101 on which the user selects the "ON" or "OFF" of the power saving mode. The CPU 26 sets the power saving mode when the "ON" is selected, and sets the normal mode when "OFF" is selected.

On a photographing screen 1100, an image that is being captured is displayed like the photographing screen 1000 in FIG. 10. Further, on the photographing screen 1100, a remaining time 1004, a recording status 1005, a photographing time code 1006, an SD card recordable time 1007, and the power mode switching screen 1101 that have been acquired by the CPU 26 are displayed through an OSD like the photographing screen 1000.

A message 1102 of the power mode switching screen 1101 is information for notifying the user of functions that are available in the normal mode but unavailable (disabled) in the power saving mode. Information on the functions disabled in the power saving mode is registered in advance in a memory such as the ROM 27. When there are a plurality of power saving modes, functions disabled in the respective power saving modes are only required to be stored in a memory. Note that the functions disabled in the power saving mode may be functions determined by the CPU 26 on the basis of a state such as the remaining amount of the battery 100 and the power consumption of the electronic apparatus 200.

In FIG. 11, information showing the names of the functions disabled in the power saving mode is displayed. The CPU 26 may display, besides the names of the disabled functions, the detailed descriptions of the functions or the like. Further, the CPU 26 may perform control so that the disabled functions are notified on the power mode switching screen 1101 when a present power mode is the normal mode, and so that the disabled functions are not notified when the present power mode is the power saving mode. Further, when there are a plurality of power saving modes, the CPU 26 may display disabled functions for each of the power saving modes. Further, CPU 26 may display information showing the names of the functions that are being used and are not being used among the functions disabled in the power saving mode.

A button 1103 is a button for selecting the power saving mode. The CPU 26 switches the power mode of the electronic apparatus 200 to the power saving mode when detecting an operation performed by the user to select the button 1103.

A button 1104 is a button for selecting the normal mode. The CPU 26 switches the power mode of the electronic apparatus 200 to the normal mode when detecting an operation performed by the user to select the button 1104.

Through the display of information on functions disabled in the power saving mode on the power mode switching screen 1101, the user is allowed to easily know which functions are disabled when switching to the power saving mode.

In step S905 of FIG. 9, the CPU 26 determines whether the user has selected the power saving mode. The CPU 26 may determine that the power saving mode has been selected, for example, when the user has selected the "ON" button 1103 for the power saving mode on the power mode switching screen 1101. The CPU 26 proceeds to step S906 when the user has selected the power saving mode. The CPU 26 proceeds to step S907 when the user has not selected the power saving mode.

In step S906, the CPU 26 sets the power mode (operating mode) of the electronic apparatus 200 to the power saving mode. The CPU 26 performs control so that functions disabled in the power saving mode are not used. Further, when the functions disabled in the power saving mode are being executed, the CPU 26 may stop the functions. Further, after setting the power saving mode, the CPU 26 may perform control so that an operation to enable the disabled functions is not received from the user.

In step S907, the CPU 26 determines whether the user has selected the normal mode. The CPU 26 may determine that the normal mode has been selected, for example, when the user has selected the "OFF" button 1104 for the power saving mode on the power mode switching screen 1101. The CPU 26 proceeds to step S908 when the user has selected the normal mode. The CPU 26 proceeds to step S909 when the user has not selected the power saving mode.

In step S908, the CPU 26 sets the power mode of the electronic apparatus 200 to the normal mode. Further, the CPU 26 enables the functions disabled in the power saving mode. That is, the CPU 26 performs control so that an operation to enable the functions disabled in the power saving mode is received from the user.

In step S909, the CPU 26 determines whether an operation to switch the power mode has been canceled. The CPU 26 may determine that the operation to switch the power mode has been canceled when the user has selected a "cancel" button displayed on the power mode switching screen 1101. Further, the CPU 26 may determine that the operation to switch the power mode has been canceled when the user has not selected both the power saving mode and the normal mode. The CPU 26 proceeds to step S910 when the operation to switch the power mode has been canceled. The CPU 26 returns to step S905 when the operation to switch the power mode has not been canceled.

In step S910, the CPU 26 hides the power mode switching screen 1101. After hiding the power mode switching screen 1101, the CPU 26 may display other screen such as the menu screen 1008 on the display unit 11.

In step S911, the CPU 26 determines whether the power supply of the electronic apparatus 200 has been turned off (OFF). For example, the CPU 26 may determine whether the power supply has been turned off according to whether power is being supplied from the battery 100 or an operation to turn off the power supply has been received from the user. The CPU 26 ends the power mode switching processing 900 when the power supply has been turned off. The CPU 26 proceeds to step S901 when the power supply has not been turned off.

As described above, the user is allowed to easily know the functions disabled in the power saving mode before switching the power mode to the power saving mode in the first embodiment. Therefore, the user is allowed to stop switching to the power saving mode when he/she wants to use the functions disabled in the power saving mode.

Second Embodiment

In a second embodiment, an electronic apparatus 200 notifies a user of functions unavailable in a power saving mode and performs control so as not to switch to the power saving mode when receiving an operation to switch to the power saving mode during the use of the functions that are available in a normal mode but are unavailable in the power saving mode. By the notification from the electronic apparatus 200, the user is allowed to easily know the fact that the switching to the power saving mode is not allowed since the functions unavailable in the power saving mode are being used, and that the functions that are unavailable in the power saving mode and are being used. Note that functions set to be enabled among the functions of the electronic apparatus 200 are functions that are being used. Further, functions set to be disabled among the functions of the electronic apparatus 200 are not functions that are being used.

Figure 12:
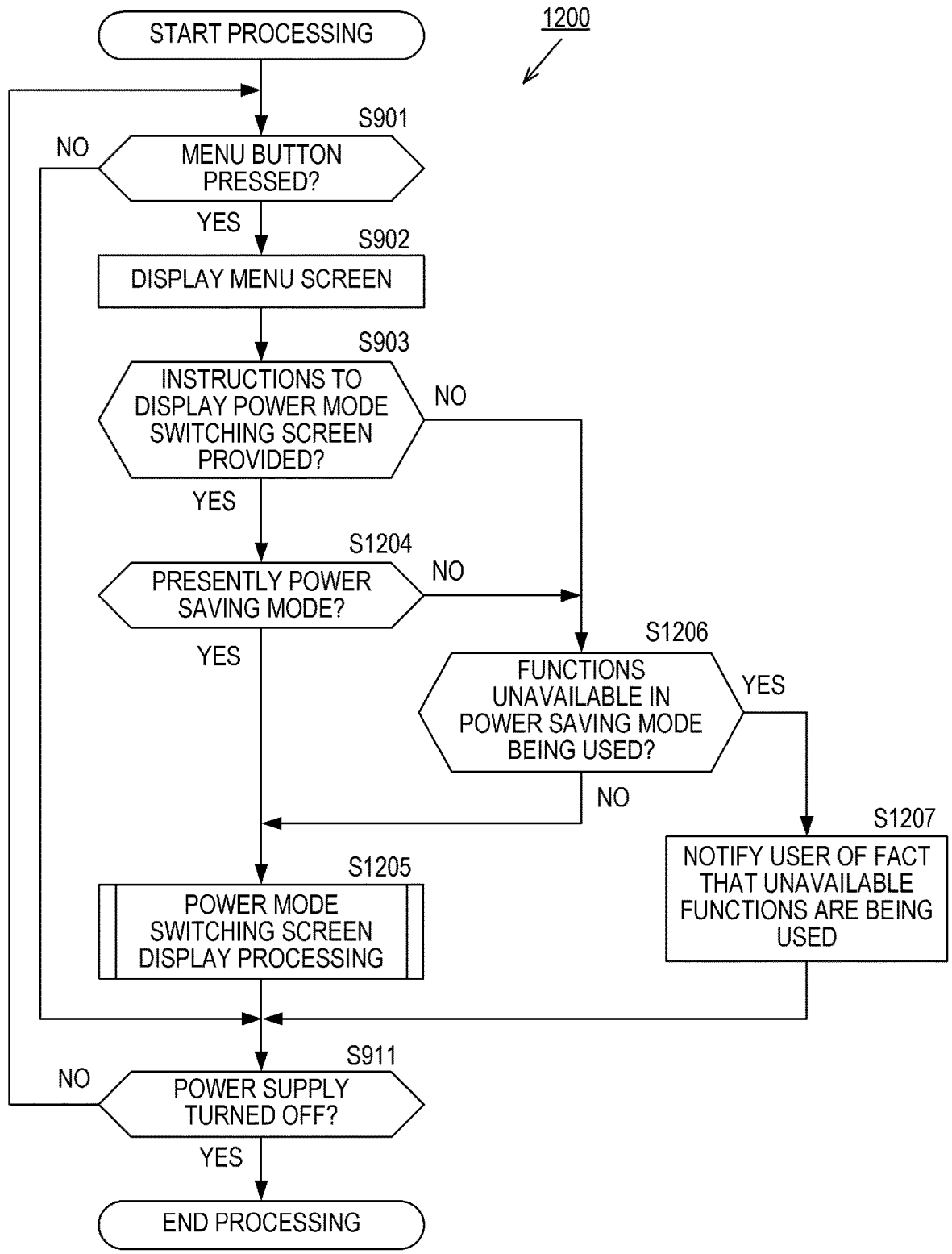
FIG. 12 is a flowchart for describing information display processing 1200 in a second embodiment.
Figure 13:
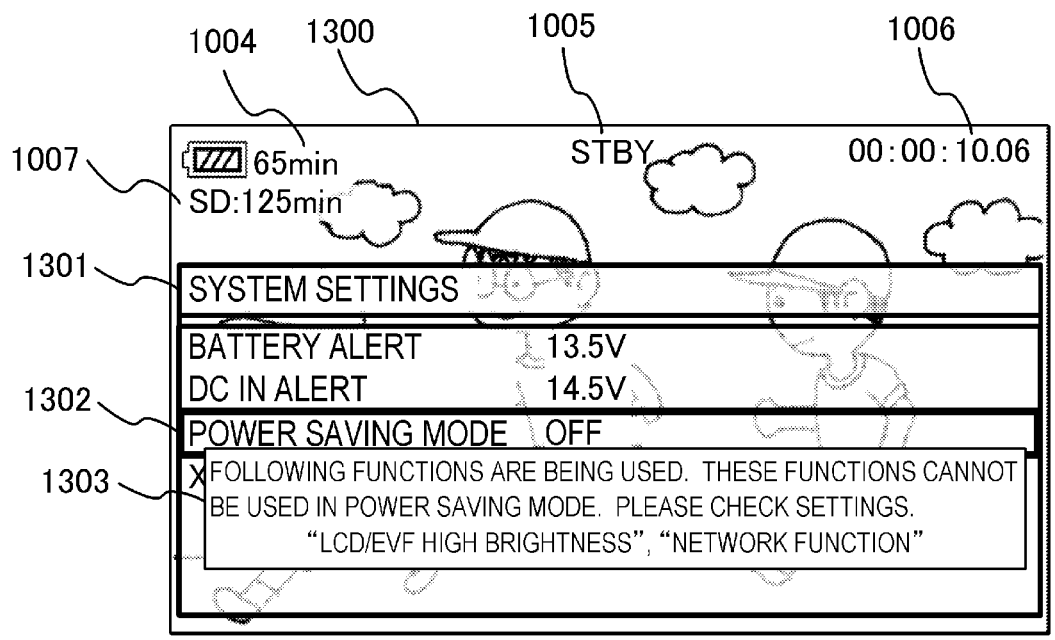
FIG. 13 is a diagram for describing a screen that displays functions unavailable in a power saving mode in the second embodiment.

With reference to FIGS. 12 and 13, a screen example and the information display processing of the electronic apparatus 200 when receiving an operation to switch to the power saving mode will be described. Like the first embodiment, the electronic apparatus 200 is an electronic apparatus able to operate as a digital video camera. FIG. 12 is a flowchart for describing information display processing 1200 in the second embodiment.

The information display processing 1200 is executed when the CPU 26 receives an instruction to switch a power mode through the operation of an operation unit 12 by a user. The information display processing 1200 is processing to display information corresponding to an operation to switch to the power saving mode. For example, when operating in the normal mode and receiving the instruction to switch to the power saving mode in a state in which functions disabled in the power saving mode are being used, the electronic apparatus 200 notifies the user of the fact that switching to the power saving mode is not allowed, besides the functions that are disabled in the power saving mode and are being used. The information display processing 1200 starts in a state in which the electronic apparatus 200 is activated with power from a battery 100 supplied thereto.

Since the processing of steps S901 to S903 of the information display processing 1200 is the same as the processing of steps S901 to S903 of the power mode switching processing 900 in the first embodiment shown in FIG. 9, their descriptions will be omitted.

In step S903, the CPU 26 proceeds to step S1204 when the instruction to display a power mode switching screen are provided. The CPU 26 proceeds to step S1206 when the instruction to display the power mode switching screen are not provided.

In step S1204, the CPU 26 determines whether a present power mode is the power saving mode. The present power mode may be determined on the basis of the settings of the electronic apparatus 200 or the present power consumption of the electronic apparatus 200. The CPU 26 proceeds to step S1205 when the present power mode is the power saving mode. The CPU 26 proceeds to step S1206 when the present power mode is not the power saving mode.

In step S1205, the CPU 26 executes display processing to display the power mode switching screen like the processing of steps S904 to S910 of the power mode switching processing 900.

In step S1206, the CPU 26 determines whether functions unavailable in the power saving mode are being used by the electronic apparatus 200. For example, in step S1206, the CPU 26 may determine that switching to the power saving mode is not allowed when at least one function unavailable (disabled) in the power saving mode is being used. Alternatively, the CPU 26 may determine that the switching to the power saving mode is not allowed when a plurality of functions among the functions unavailable in the power saving mode are being used. Further, in a case in which there are a plurality of functions unavailable in the power saving mode, the CPU 26 may determine that the switching to the power saving mode is not allowed when a predetermined combination of functions among the plurality of functions are being used.

The CPU 26 proceeds to step S1205 when the functions unavailable in the power saving mode are not being used. The CPU 26 proceeds to step S1207 when the functions unavailable in the power saving mode are being used.

In step S1207, the CPU 26 notifies the user of the fact that the functions that are available in the normal mode but are unavailable in the power saving mode are being used by the electronic apparatus 200. The CPU 26 displays the notification to the user on a display unit 11.

Here, the notification to the user in step S1207 will be described with reference to FIG. 13. FIG. 13 shows an example of a message displayed when the user performs an operation to switch to the power saving mode in a state in which the electronic apparatus 200 executes functions unavailable in the power saving mode during an operation in the normal mode.

On a photographing screen 1300, an image that is being captured is displayed like the photographing screen 1000 in FIG. 10. Further, on the photographing screen 1300, a remaining time 1004, a recording status 1005, a photographing time code 1006, an SD card recordable time 1007, and a menu screen 1301 that have been acquired by the CPU 26 are displayed through an OSD like the photographing screen 1000. Since the menu screen 1301 and a menu item 1302 are the same as the menu screen 1008 and the menu item 1009 in FIG. 10, respectively, their descriptions will be omitted.

The message 1303 includes a content to notify the user of the fact that functions unavailable in the power saving mode are being used. The content of the message 1303 may be expressed in other form so long as it is possible to notify the user of the fact that the functions unavailable in the power saving mode are being used and that switching to the power saving mode is not allowed. For example, the message 1303 may be expressed by an icon or the like other than a character string, or may be displayed at a position other than the menu screen.

Further, in the message 1303, only the names of functions that are being used at the present moment or the names of all the functions unavailable in the power saving mode among the functions unavailable in the power saving mode may be displayed. Through the display of the message 1303, the user is allowed to easily know which functions under execution cause restriction on the switching to the power saving mode when switching to the power saving mode.

Since step S911 of the information display processing 1200 is the same as step S911 of the power mode switching processing 900, its description will be omitted.

As described above, the user is notified of the fact that functions unavailable in the power saving mode are being used when the instruction to switch to the power saving mode are provided during the use of the functions unavailable in the power saving mode in the second embodiment. Further, in the second embodiment, the user is notified of information on the functions unavailable in the power saving mode and prevented from performing switching from the normal mode to the power saving mode. Therefore, the user is allowed to easily know which functions under execution cause restriction on switching to the power saving mode when the switching to the power saving mode is not performed.

Note that the CPU 26 may display, besides the message 1303, a user interface (UI) such as an operation button that causes the user to select whether to stop using functions unavailable in the power saving mode and switch to the power saving mode. When the user performs an operation to stop using the functions unavailable in the power saving mode and switch to the power saving mode, the CPU 26 stops using functions that are being used among the functions unavailable in the power saving mode and switches to the power saving mode. Accordingly, the user is allowed to save time and effort to perform an operation to stop the functions that are being used among the functions unavailable in the power saving mode and an operation to switch the power mode from the normal mode to the power saving mode and easily switch to the power saving mode.

Third Embodiment

In a third embodiment, an electronic apparatus 200 notifies, when receiving an operation to set any function among functions disabled in a power saving mode to be enabled during an operation in the power saving mode, a user of the fact that the function to be set is disabled in the power saving mode. The user is allowed to easily know that the function to be set is a function disabled in the power saving mode.

Figure 14:
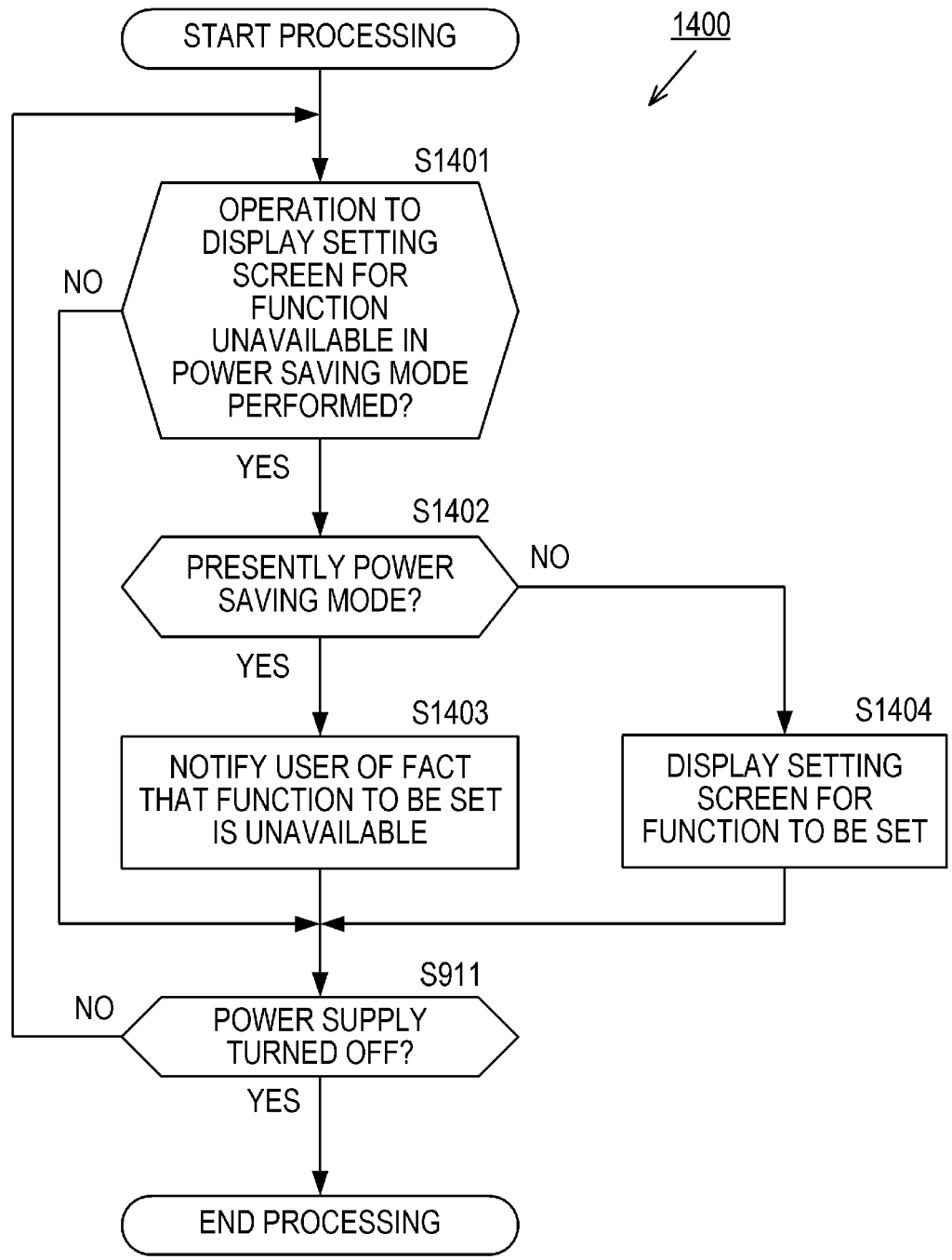
FIG. 14 is a flowchart for describing information display processing 1400 in a third embodiment.
Figure 15:
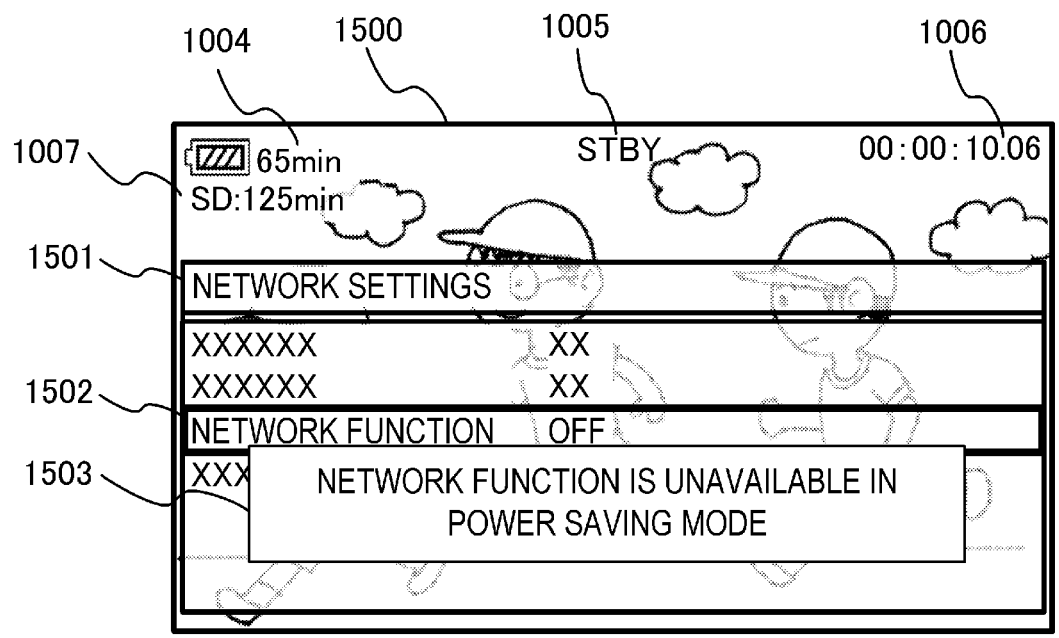
FIG. 15 is a diagram for describing a screen that is displayed in response to the setting operation of functions unavailable in a power saving mode in the third embodiment.

With reference to FIGS. 14 and 15, a screen example and the information display processing of the electronic apparatus 200 when receiving an operation to set any function among functions disabled in the power saving mode to be enabled will be described. The electronic apparatus 200 in the third embodiment is an electronic apparatus able to operate as a digital video camera like the first and second embodiments.

FIG. 14 is a flowchart for describing information display processing 1400 in the third embodiment. The information display processing 1400 is processing to display, when a CPU 26 receives an operation to set any function among functions disabled in the power saving mode to be enabled during an operation in the power saving mode, information showing that the function to be set is disabled in the power saving mode. The information display processing 1400 starts in a state in which the electronic apparatus 200 is activated with power from a battery 100 supplied thereto.

In step S1401, the CPU 26 determines whether an operation to display a setting screen for any function among functions unavailable in the power saving mode has been received. The CPU 26 proceeds to step S1402 when the operation to display the setting screen for any function among the functions unavailable in the power saving mode has been performed. The CPU 26 proceeds to step S911 when the operation to display the setting screen for any function among the functions unavailable in the power saving mode has not been performed.

In step S1402, the CPU 26 determines whether a present power mode is the power saving mode. The present power mode may be determined on the basis of the settings of the electronic apparatus 200 or the present power consumption of the electronic apparatus 200. The CPU 26 proceeds to step S1403 when the present power mode is the power saving mode. The CPU 26 proceeds to step S1404 when the present power mode is not the power saving mode.

In step S1403, the CPU 26 notifies the user of the fact that the function to be set that is set on a setting screen being displayed is a function unavailable in the power saving mode. The CPU 26 displays the notification to the user on a display unit 11.

Here, the notification to the user in step S1403 will be described with reference to FIG. 15. FIG. 15 shows an example of a display screen displayed when the user has performed an operation to set any function among functions disabled in the power saving mode to be enabled during the operation of the electronic apparatus 200 in the power saving mode.

On a photographing screen 1500, an image that is being captured is displayed like the photographing screen 1000 in FIG. 10. Further, on the photographing screen 1500, a remaining time 1004, a recording status 1005, a photographing time code 1006, an SD card recordable time 1007, and a menu screen 1501 that have been acquired by the CPU 26 are displayed through an OSD like the photographing screen 1000.

The menu screen 1501 is an example of a screen in which a menu item about "network settings" is displayed. A menu item 1502 is an item for setting a network function to be enabled or disabled. When the user selects the menu item 1502, the electronic apparatus 200 displays a setting screen for the network function. The user is allowed to set the network function to be turned on (enabled) or turned off (disabled) on the displayed screen.

A message 1503 includes a content notifying the user of the fact that a function to be used is unavailable since the electronic apparatus 200 is operating in the power saving mode. The message 1503 is only required to be information for notifying the user of the fact that the function to be used by the user is disabled in the power saving mode. The message 1503 may be expressed by an icon or the like other than a character string, or may be displayed at a position other than the menu screen.

Through the display of the message 1503, the user is allowed to easily know, when performing an operation to set any function among functions disabled in the power saving mode to be enabled, that the function to be set is unavailable in the power saving mode.

In step S1404 of the information display processing 1400, the CPU 26 displays a setting screen for setting the function to be set in step S1401 to be enabled or disabled on the display unit 11. The user is allowed to set the function to be set to be turned on or turned off on the setting screen.

Since step S911 of the information display processing 1400 is the same as step S911 of the power mode switching processing 900, its description will be omitted. However, the CPU 26 returns to step S1401 when a power supply is not turned off.

As described above, in a third embodiment the electronic apparatus 200 notifies, when receiving an operation to set any function among functions disabled in the power saving mode to be enabled, the user of the fact that the function to be set is disabled in the power saving mode. When setting any function among the functions disabled in the power saving mode to be enabled, the user is allowed to easily know that the function to be set is disabled in the power saving mode.

Note that the CPU 26 may display, besides the message 1503, a UI such as an operating button for causing the user to select whether to switch to a normal mode and enable the function to be set. When the user provides the instruction to switch to the normal mode and enable the function to be set, the CPU 26 switches a power mode to the normal mode and sets the function to be set to be enabled. Accordingly, the user is allowed to save time and effort to perform an operation to switch the power mode to the normal mode and an operation to set the function to be enabled.

Fourth Embodiment

In a fourth embodiment, an electronic apparatus performs control to change or maintain a power mode according to whether a switching condition for the switching of the power mode is satisfied. Thus, the electronic apparatus is able to prevent its shutdown immediately after the switching of the power mode due to the shortage of power supplied from a battery when the power mode is switched to a power mode having higher power consumption.

Figure 5:
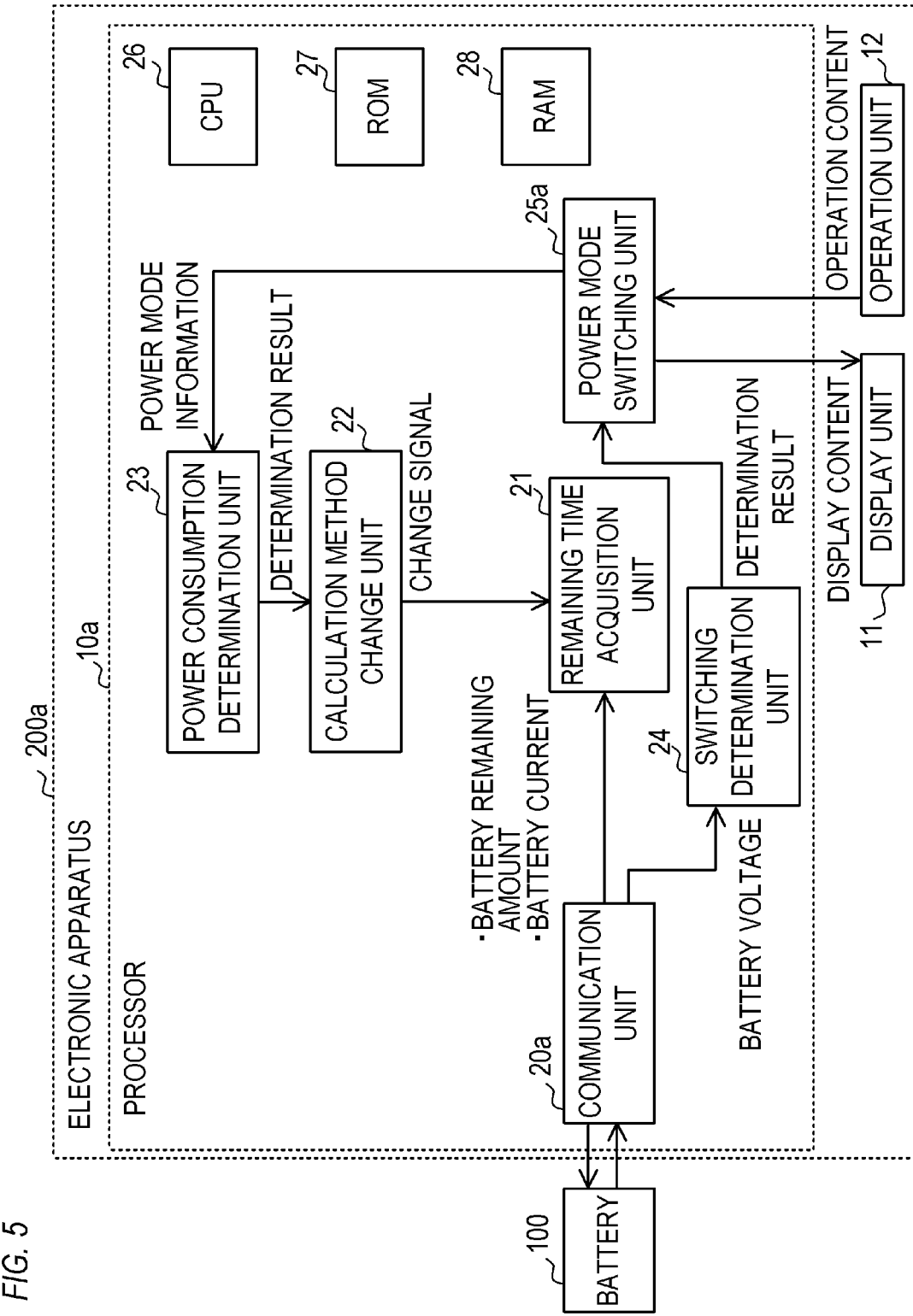
FIG. 5 is a block diagram for describing some of the configurations of an electronic apparatus 200a in a fourth embodiment.

Some of the configurations of an electronic apparatus 200*a* in the fourth embodiment will be described with reference to FIG. 5. Matters that will not be mentioned as the configurations and operations of the fourth embodiment conform to those of the first embodiment. In the fourth embodiment, the processor 10, the communication unit 20, and the power mode switching unit 25 in the first embodiment are replaced by a processor 10*a*, a communication unit 20*a*, and a power mode switching unit 25*a*, respectively.

In the fourth embodiment, the electronic apparatus 200*a* further has a switching determination unit 24. The switching determination unit 24 determines whether any of the remaining time of the electronic apparatus 200*a*, the remaining amount of a battery, and a battery voltage satisfies a switching condition for switching to a power mode having power consumption higher than that of a present power mode. On the basis of the determination result of the switching determination unit 24, the power mode switching unit 25*a* performs control whether to switch a power mode according to the instruction to switch to a power mode having power consumption higher than that of a present power mode (for example, from a power saving mode to a normal mode) from a user. When the switching determination unit 24 determines that a switching condition for switching to the normal mode is satisfied, the power mode switching unit 25*a* performs the switching of the power mode to the normal mode according to the instruction to switch from the power saving mode to the normal mode from the user. When the switching determination unit 24 determines that the switching condition is not satisfied, the power mode switching unit 25*a* does not perform the switching of the power mode from the power saving mode to the normal mode according to the instruction from the user. When the switching determination unit 24 determines that the switching condition is not satisfied, an operation unit 12 may not receive the instruction to switch from the power saving mode to the normal mode.

Further, the power mode switching unit 25*a* outputs a display content including information on a power mode to a display unit 11 according to the determination result of the switching determination unit 24. The operation unit 12 outputs an operation content selected and operated by the user to the power mode switching unit 25*a*. Here, the display unit 11 displays a power mode, which is determined as being not satisfying the switching condition by the switching determination unit 24, as a state that is not selectable through the operation unit 12. Since the operation unit 12 does not receive the selection of the power mode not satisfying the switching condition, the electronic apparatus 200*a* is able to prevent its shutdown immediately after the switching of the power mode due to the shortage of power supplied from the battery. The power mode switching unit 25*a* outputs a power mode selected by the user to a power consumption determination unit 23 as power mode information. A remaining time is calculated according to the method described in the first embodiment. A CPU 26 ends the driving of the electronic apparatus 200*a* on the basis of a remaining time acquired by a remaining time acquisition unit 21. Note that the CPU 26 may end the driving of the electronic apparatus 200*a* on the basis of a battery remaining amount (reference capacity) or a battery voltage (reference voltage) that is set in advance.

Figure 6:
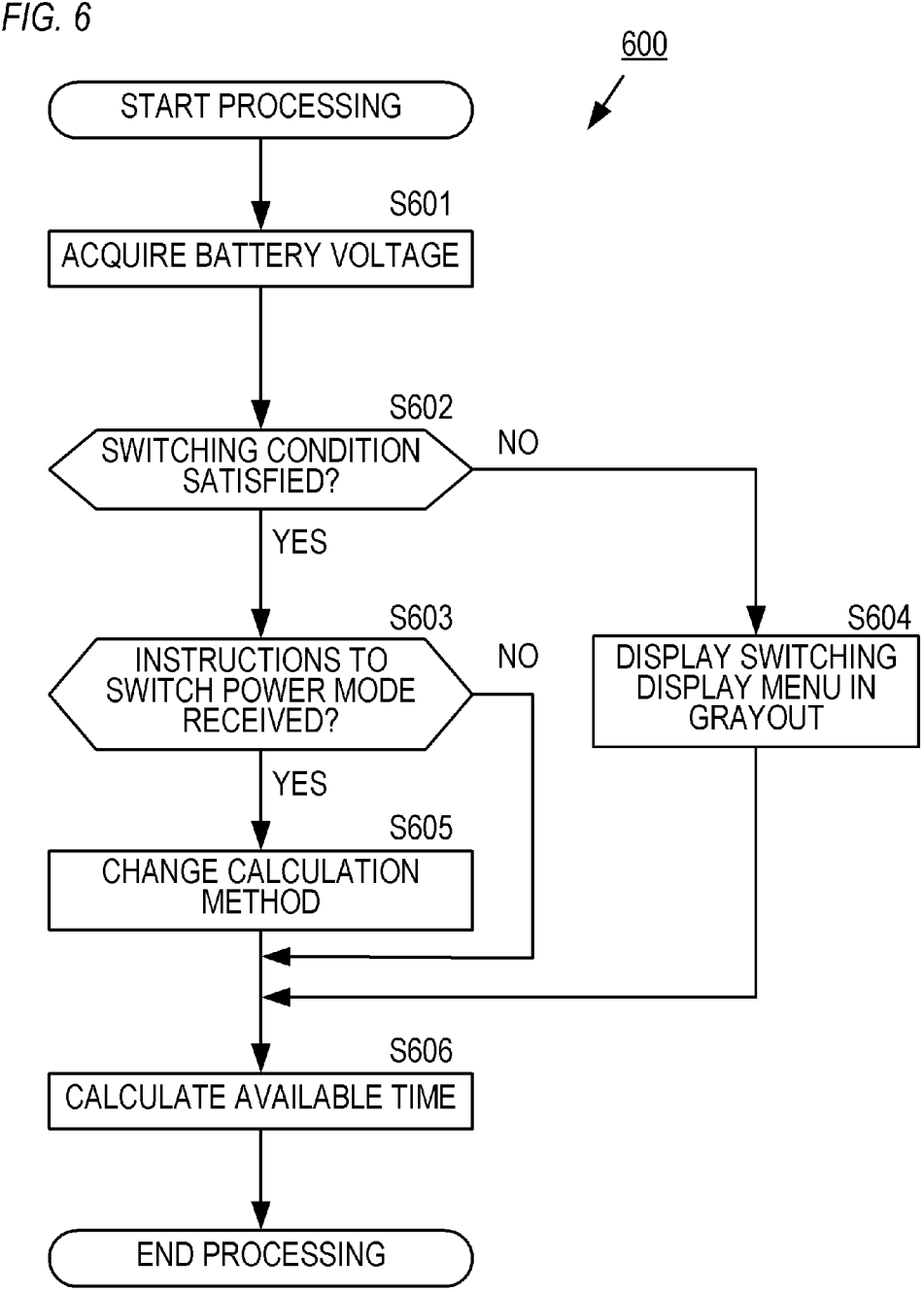
FIG. 6 is a flowchart for describing display switching processing 600 for a power mode.

FIG. 6 is a flowchart describing display switching processing 600 for a power mode. The display switching processing 600 starts when the power supply of the electronic apparatus 200*a* is turned on.

In step S601, the communication unit 20*a* acquires a battery voltage from the battery 100. Note that the battery voltage is acquired at, for example, every predetermined interval.

In step S602, the switching determination unit 24 determines whether the battery voltage acquired in step S601 satisfies a switching condition for switching from the power saving mode to the normal mode. Note that the switching determination unit 24 determines that the switching condition is satisfied as for switching from the normal mode to the power saving mode. The processing proceeds to step S603 when the battery voltage satisfies the switching condition for switching to the normal mode. Otherwise, the processing proceeds to step S604.

Figure 7:
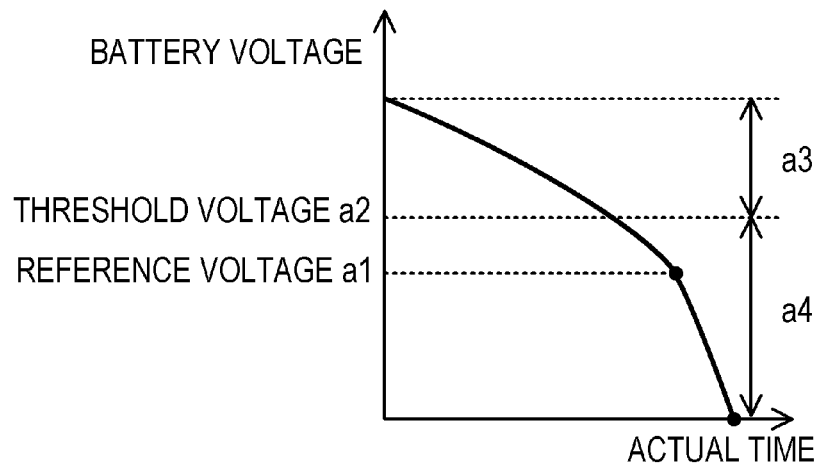
FIG. 7 is a diagram for describing the determination of a power mode switching condition when the electronic apparatus 200a has two power modes.

Here, the switching condition for switching to the normal mode will be described with reference to FIG. 7. The switching condition for switching to the normal mode includes, for example, any of a condition that a battery voltage is at least a threshold voltage, a condition that a battery remaining amount is at least a threshold capacity, and a condition that a remaining time is at least a threshold remaining time. Note that the switching determination unit 24 may combine a plurality of conditions among the three conditions together and determine whether the combined conditions are satisfied. Each of the conditions will be described below.

When the switching condition is the condition that the battery voltage is at least a threshold voltage, the switching determination unit 24 compares the battery voltage acquired by the communication unit 20*a* with a threshold voltage stored in advance in a ROM 27. The switching determination unit 24 determines that the switching condition is satisfied when the battery voltage is at least the threshold voltage. The switching determination unit 24 determines that the switching condition is not satisfied when the battery voltage is less than the threshold voltage.

The determination of the switching condition based on a battery voltage will be described with reference to FIG. 7. FIG. 7 is a graph showing a change in the battery voltage relative to the actual operating time (actual time) of the electronic apparatus 200*a*. A vertical axis shows the battery voltage, and a horizontal axis shows the actual time. In the normal mode, the remaining time of the electronic apparatus 200*a* is calculated so as to become zero when the battery voltage drops to a reference voltage a1. The electronic apparatus 200*a* ends its driving (shuts down) when the remaining time of the electronic apparatus 200*a* becomes zero. A threshold voltage a2 is a value different from the value of the reference voltage a1 and set at a value higher than the value of the reference voltage a1. The switching determination unit 24 determines that the switching condition for switching to the normal mode is satisfied when the battery voltage is at least the threshold voltage a2 (falls within the range of a3 in FIG. 7). The switching determination unit 24 determines that the switching condition for switching to the normal mode is not satisfied when the battery voltage is less than the threshold voltage (falls within the range of a4 in FIG. 7).

By setting a value higher than the reference voltage corresponding to the normal mode as the value of the threshold voltage, the following effect is, for example, obtained. If the value of the threshold voltage is set to be the same as the value of the reference voltage corresponding to the normal mode, it is determined that the switching condition for switching from the power saving mode to the normal mode is satisfied in a state in which the battery voltage is equal to the reference voltage. The reference voltage corresponding to the power saving mode is lower than the reference voltage corresponding to the normal mode. Therefore, in the power saving mode, the remaining time does not become zero in a state in which the battery voltage is equal to the reference voltage corresponding to the normal mode.

However, in the power saving mode, the remaining time is calculated as zero when the power saving mode is switched to the normal mode in a state in which the battery voltage is equal to the reference voltage corresponding to the normal mode. Accordingly, the electronic apparatus 200a immediately shuts down at a timing at which the power mode is changed. Therefore, the power mode is switched pointlessly for a user. In view of this, the threshold voltage is only required to be set at a value higher than the value of the reference voltage corresponding to the normal mode. As a result of setting the threshold voltage at a value higher than the value of the reference voltage corresponding to the normal mode, the switching determination unit 24 determines that the switching condition for switching from the power saving mode to the normal mode is not satisfied in a state in which the battery voltage is equal to the reference voltage corresponding to the normal mode. Since the power mode switching unit 25a does not perform the switching of the power mode from the power saving mode to the normal mode according to the instruction from the user, the electronic apparatus 200a is able to prevent its shutdown immediately after the switching to the normal mode due to the shortage of power supplied from the battery.

The threshold voltage may be, for example, one obtained by adding an offset voltage, which is based on the minimum operating time (the time required for the electronic apparatus 200a to operate until the end of its driving) of the electronic apparatus 200a after the power mode is switched to the normal mode, to the reference voltage. More specifically, the offset voltage may be determined on the basis of the operating time of the electronic apparatus 200a before the battery voltage in the normal mode reduces from the threshold voltage to the reference voltage. For example, when the minimum operating time after the power mode is switched from the power saving mode to the normal mode is five minutes, the threshold voltage may be a value obtained by measuring a battery voltage ΔV that reduces after the electronic apparatus 200a operates for five minutes in the normal mode and then adding the battery voltage ΔV to the reference voltage corresponding to the normal mode. The minimum operating time may be a value set in advance or a value settable by the user.

When the switching condition is the condition that a battery remaining amount is at least a threshold capacity, the switching determination unit 24 compares a battery remaining amount received from the communication unit 20a with a threshold capacity stored in advance in the ROM 27. The switching determination unit 24 determines that the switching condition for switching to the normal mode is satisfied when the battery remaining amount is at least the threshold capacity. The switching determination unit 24 determines that the switching condition for switching to the normal mode is not satisfied when the battery remaining amount is less than the threshold capacity. The threshold capacity may be a value higher than a reference capacity with which the electronic apparatus 200a performs shutdown processing in the normal mode. The threshold capacity may be, for example, one obtained by adding an offset capacity, which is based on the minimum operating time of the electronic apparatus 200a after the power mode is switched to the normal mode, to the reference capacity. More specifically, the offset capacity may be determined on the basis of the operating time of the electronic apparatus 200a before the battery capacity in the normal mode reduces from the threshold capacity to the reference capacity.

When the switching condition is the condition that a remaining time is at least a threshold remaining time, the switching determination unit 24 compares a remaining time after the power mode is switched to the normal mode with a threshold time stored in advance in the ROM 27. The remaining time is calculated according to the method described in the first embodiment. The switching determination unit 24 determines that the switching condition for switching to the normal mode is satisfied when the remaining time is at least the threshold remaining time. The switching determination unit 24 determines that the switching condition for switching to the normal mode is not satisfied when the remaining time is less than the threshold remaining time. The threshold remaining time may be, for example, a minimum operating time after the switching of the power mode.

In S603 of FIG. 6, the power mode switching unit 25a determines whether the instruction to switch a power mode have been received from the user. Specifically, the power mode switching unit 25a determines whether the instruction to switch to the normal mode have been received during an operation in the power saving mode. The processing proceeds to step S605 when the power mode switching unit 25a has received the instruction to switch to the normal mode. Otherwise, the processing proceeds to step S606.

In step S604, the display unit 11 displays the normal mode as a state that is not selectable. For example, the display unit 11 displays a power mode switching display menu itself as a state that is not selectable. Note that the display unit 11 may display the normal mode as a state that is not selectable although the power mode switching display menu is selectable. The state that is not selectable is, for example, a state that is displayed but is not selectable, i.e., a state that is displayed in grayout. Note that the display unit 11 may display the switching display menu or the normal mode to the user so as not to be selectable through an icon or the like or may not display the switching display menu or the normal mode other than displaying the same in grayout. Further, for example, when receiving a power mode that is not selectable, the display unit 11 may display a message screen to notify the user of the fact that the power mode is not selectable. Further, for example, the display unit 11 may display the ON and OFF of the power saving mode instead of displaying the alternatives of the normal mode and the power saving mode. When displaying the ON and OFF of the power saving mode, the display unit 11 may display the OFF of the power saving mode as a state that is not selectable according to the determination result of the switching determination unit 24. Note that the display method is not limited to the above methods but is only required to be a display method with which the user is notified of the fact that a change in a power mode having power consumption higher than that of a present power mode is not allowed. Like this, switching to a power mode having higher power consumption is suppressed in a state in which supplied power is short. Thus, the electronic apparatus 200a is able to prevent its immediate shutdown due to the shortage of power supplied from the battery that may occur along with the switching of a power mode.

In step S605, the calculation method change unit 22 changes a calculation method for calculating the remaining time of the electronic apparatus 200a according to the power mode to which the power mode switching unit 25a has been instructed to switch in step S603. The calculation method change unit 22 changes the correction coefficient k used to calculate the remaining time from the value of the power saving mode to the value of the normal mode.

In step S606, the remaining time acquisition unit 21 calculates the remaining time of the electronic apparatus 200a using the calculation method described in the first embodiment. The processing of steps S601 to S606 is repeatedly executed at a predetermined interval during the operation of the electronic apparatus 200a.

Figure 8:
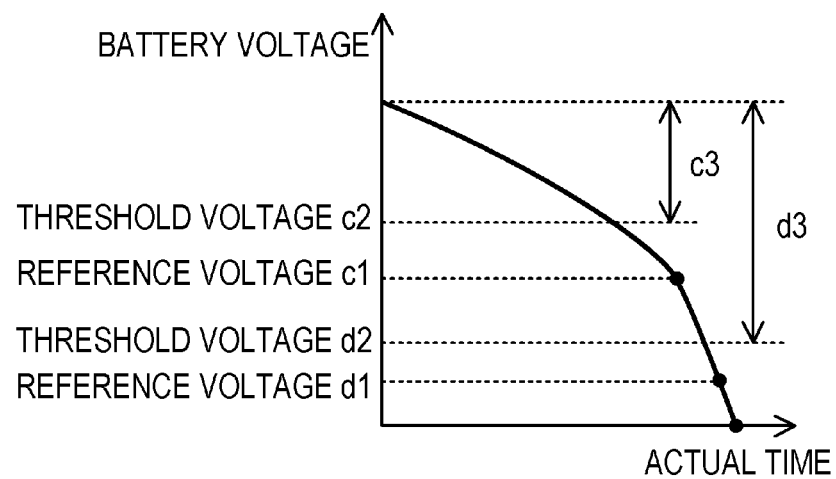
FIG. 8 is a diagram for describing the determination of a power mode switching condition when the electronic apparatus 200a has three power modes.

In FIG. 8, processing when the electronic apparatus 200a has three power modes will be described. In FIG. 7, a case in which the electronic apparatus 200a has the two power modes of the normal mode and the power saving mode is described as an example. However, the above method is also applicable to a case in which the electronic apparatus 200a has at least three power modes. For example, the electronic apparatus 200a has the three power modes of a normal mode, a first power saving mode, and a second power saving mode in descending order of power consumption. In this case, the electronic apparatus 200a performs shutdown processing when its battery voltage drops to a reference voltage c1 in the normal mode, and performs the shutdown processing when the battery voltage drops to a reference voltage d1 in the first power saving mode.

The switching determination unit 24 compares the battery voltage with a threshold voltage c2 and determines whether a condition for switching from the first power saving mode or the second power saving mode to the normal mode is satisfied. Further, the switching determination unit 24 compares the battery voltage with a threshold voltage d2 and determines whether a condition for switching from the second power saving mode to the first power saving mode is satisfied. The switching determination unit 24 determines that the condition for switching from the first power saving mode or the second power saving mode to the normal mode is satisfied when the battery voltage is at least a threshold voltage c2 (falls within the range of c3 in FIG. 8). The switching determination unit 24 determines that the condition for switching from the second power saving mode to the first power saving mode is satisfied when the battery voltage is at least a threshold voltage d2 (falls within the range of d3 in FIG. 8). The power mode switching unit 25a outputs a display content to the display unit 11 so that a power mode, which is determined as being not satisfying the switching condition for switching the power mode by the switching determination unit 24, is displayed as a state that is not selectable through, for example, a grayout display or the like. When the electronic apparatus 200a has at least the three power modes as described above, the electronic apparatus 200a is able to prevent its shutdown immediately after the switching of the power modes. Note that even when the electronic apparatus 200a has at least the three power modes, a condition used by the switching determination unit 24 to make a determination is not limited to the comparison of a battery voltage but may include other conditions such as the comparison of a battery remaining amount and the comparison of the remaining time of the electronic apparatus 200a like the case in which the electronic apparatus 200a has the two power modes. Note that when the electronic apparatus 200a has at least the three power modes, the switching determination unit 24 is able to determine that a condition for switching is satisfied as for switching from the normal mode to the first power saving mode or the second power saving mode and switching from the first power saving mode to the second power saving mode.

According to the fourth embodiment, the electronic apparatus 200a is able to prevent its shutdown immediately after the switching of a power mode due to the shortage of power supplied from the battery.

Fifth Embodiment

In a fifth embodiment, an electronic apparatus performs control to change a power mode according to whether a condition for switching to a normal mode having higher power consumption is satisfied like the fourth embodiment. In the fifth embodiment, the electronic apparatus notifies a user of a reason why the condition for switching to the normal mode having the higher power consumption is not satisfied. For example, the electronic apparatus notifies, when the switching of a power mode is restricted, the user of the fact that switching to a power mode having higher power consumption is restricted since the remaining amount of a battery is insufficient.

Figure 16:
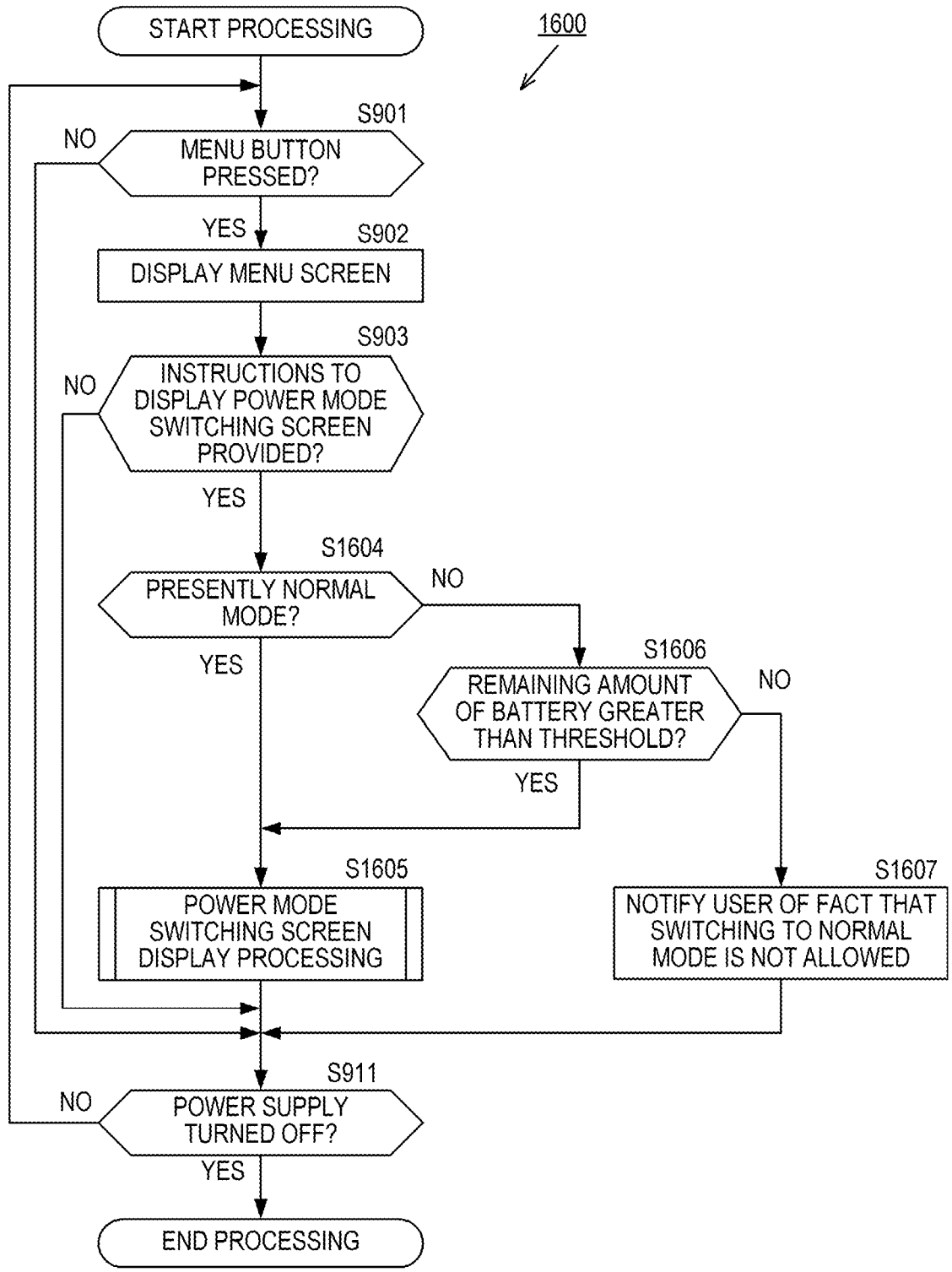
FIG. 16 is a flowchart for describing information display processing 1600 in a fifth embodiment.
Figure 17:
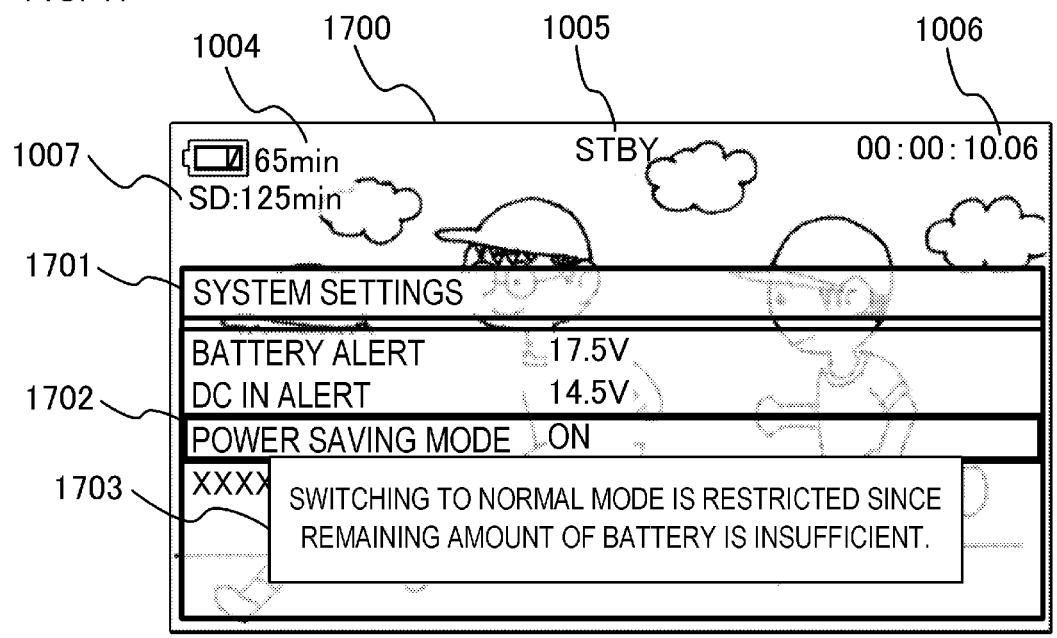
FIG. 17 is a diagram for describing a screen that notifies a user of a reason why switching to a normal mode is restricted in the fifth embodiment.

Since the electronic apparatus in the fifth embodiment is the same as the electronic apparatus 200a in the fourth embodiment, its description will be omitted. With reference to FIGS. 16 and 17, a screen example and the information display processing of an electronic apparatus 200a when receiving an operation to switch to a power mode having higher power consumption in a state in which the remaining amount of a battery is insufficient will be described. The electronic apparatus 200a in the fifth embodiment is an electronic apparatus 200a able to operate as a digital video camera like the first to fourth embodiments.

FIG. 16 is a flowchart for describing information display processing 1600 in the fifth embodiment. The information display processing 1600 is processing in which a CPU 26 notifies a user of a reason why switching to a normal mode having higher power consumption is restricted. According to the fifth embodiment, the user is allowed to know a reason why switching to a power mode having higher power consumption is restricted. The information display processing 1600 starts in a state in which the electronic apparatus 200a is activated with power from a battery 100 supplied thereto.

Since the processing of steps S901 to S903 of the information display processing 1600 is the same as the processing of steps S901 to S903 of the power mode switching processing 900 in the first embodiment, their descriptions will be omitted.

In step S903, the CPU 26 proceeds to step S1604 when an operation to display a power mode switching screen has been performed. The CPU 26 proceeds to step S911 when the operation to display the power mode switching screen has not been performed.

In step S1604, the CPU 26 determines whether a present power mode is the normal mode. The present power mode may be determined on the basis of the settings of the electronic apparatus 200a or the present power consumption of the electronic apparatus 200a. The CPU 26 proceeds to step S1605 when the present power mode is the normal mode. The CPU 26 proceeds to step S1606 when the present power mode is not the normal mode.

In step S1605, the CPU 26 executes power mode switching screen display processing that is the same as the processing of steps S904 to S910 of the power mode switching processing 900.

In step S1606, the CPU 26 determines whether the remaining amount of the battery 100 is greater than a threshold. The threshold may be a value stored in advance in a ROM 27 or the like, or may be a power amount with which the electronic apparatus 200a is able to operate for a predetermined time (for example, five minutes) in a power mode after switching. The CPU 26 proceeds to step S1605 when the remaining amount of the battery 100 is greater than the threshold. The CPU 26 proceeds to step S1607 when the remaining amount of the battery 100 is not more than the threshold.

Note that in step S1606, the CPU 26 may perform a determination on the basis of the same switching condition for the normal mode as that in the fourth embodiment besides determining whether the remaining amount of the battery 100 is greater than the threshold. That is, the CPU 26 is able to determine the possibility of switching to the normal mode according to whether a battery voltage is higher than a threshold voltage or according to whether the remaining time of the electronic apparatus 200a is longer than a threshold remaining time. Further, the CPU 26 may determine the possibility of the switching to the normal mode according to any one of a plurality of switching conditions, or may determine the possibility of the switching to the normal mode according to a combination of the plurality of switching conditions.

In step S1607, the CPU 26 notifies the user of the fact that the switching to the normal mode is not allowed since the remaining amount of the battery 100 is insufficient. When receiving an operation to switch to the normal mode, the CPU 26 notifies the user of the fact that the switching to the normal mode is not allowed in a case in which the electronic apparatus 200a is operating in a power saving mode and the remaining amount of the battery 100 is not more than the threshold. The CPU 26 displays the notification to the user on a display unit 11.

Here, the notification to the user in step S1607 will be described with reference to FIG. 17. FIG. 17 shows an example of a message displayed when the user has performed an operation to display the power mode switching screen during the operation of the electronic apparatus 200a in the power saving mode. FIG. 17 shows an example of a message in a case in which the remaining amount of the battery 100 becomes not more than a threshold in the power saving mode and the CPU 26 restricts switching to the normal mode.

Note that the CPU 26 notifies, when performing a determination on the basis of the same switching condition for the normal mode as that in the fourth embodiment in step S1606, the user of a reason why switching to the normal mode is restricted according to the determined switching condition.

On a photographing screen 1700, an image that is being captured is displayed like the photographing screen 1000 in FIG. 10. Further, on the photographing screen 1700, a remaining time 1004, a recording status 1005, a photographing time code 1006, an SD card recordable time 1007, and a menu screen 1701 that have been acquired by the CPU 26 are displayed through an OSD like the photographing screen 1000. Since a menu screen 1701 and a menu item 1702 are the same as the menu screen 1008 and the menu item 1009 in FIG. 10, their descriptions will be omitted.

A message 1703 includes a content notifying the user of the fact that switching to the normal mode is not allowed since the remaining amount of the battery 100 is insufficient. The message 1703 is only required to be a message for notifying the user of the fact that the switching to the normal mode is not allowed since the remaining amount of the battery 100 is insufficient. The message 1703 may be expressed by an icon or the like other than a character string, or may be displayed at a position other than the menu screen.

Since step S911 of the information display processing 1600 is the same as step S911 of the power mode switching processing 900, its description will be omitted.

As described above, the electronic apparatus 200a notifies, when the remaining amount of the battery 100 reduces and a switching condition for the normal mode is not satisfied, the user of a reason why switching to the normal mode is not allowed in the fifth embodiment. When the switching to the normal mode is restricted, the user is allowed to know the reason for the restriction.

Sixth Embodiment

At least one of the various functions, processing, and methods described in the above embodiments may be realized when a personal computer, a micro computer, a CPU, or a micro processor executes a program. Hereinafter, a personal computer, a micro computer, a CPU, or a micro processor will be called a "computer X" in a sixth embodiment. In the sixth embodiment, a program for controlling the computer X and realizing at least one of the various functions, processing, and methods described in the above embodiments will be called a "program Y".

At least one of the various functions, processing, and methods described in the above embodiments is realized when the computer X executes the program Y. In this case, the program Y is supplied to the computer X via a computer-readable storage medium. The computer-readable storage medium in the sixth embodiment includes at least one of a hard disk device, a magnetic storage device, an optical storage device, a magneto-optical storage device, a memory card, a volatile memory, and a non-volatile memory. The computer-readable storage medium in the sixth embodiment is a non-transitory storage medium.

The above embodiments only show a configuration example of the present invention exemplarily. The configurations of the respective embodiments are not limited to the above specific modes but may be appropriately used in combination within the range of the technical ideas of the present invention. Further, the present invention may be modified in various ways without departing from the technical ideas.

The user is allowed to easily know functions that become unavailable after the switching of a power mode.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-126200, filed on Jul. 30, 2021, which is hereby incorporated by reference herein in its entirety.

What is claimed is:

1. An electronic apparatus comprising:
at least one processor; and
at least one memory storing a program which, when executed by the at least one processor, causes the electronic apparatus to function as:
a reception unit configured to receive an instruction from a user;
a control unit configured to perform control to set an operating mode of the electronic apparatus to any of a plurality of operating modes including a first mode and a second mode having maximum power consumption lower than maximum power consumption of the first mode according to the instruction from the user, wherein part of a plurality of functions of the electronic apparatus that are available in the first mode are unavailable in the second mode; and
a notification unit configured to notify the user of functions unavailable in the second mode among the plurality of functions available in the first mode according to a reception of the instruction to set the operating mode of the electronic apparatus from the user.

2. The electronic apparatus according to claim 1, wherein the control unit sets the operating mode of the electronic apparatus to the first mode in response to an instruction to set the first mode from the user and sets the operating mode of the electronic apparatus to the second mode in response to an instruction to set the second mode from the user after the notification by the notification unit.

3. The electronic apparatus according to claim 1, wherein the control unit does not perform switching from the first mode to the second mode according to the instruction from the user after the notification by the notification unit, in a case where a present operating mode of the electronic apparatus is the first mode and the functions unavailable in the second mode are being used by the electronic apparatus, and
the notification unit notifies the user that switching to the second mode is not implemented since the functions unavailable in the second mode are being used after receiving the instruction to set the operating mode from the user, in a case where the present operating mode of the electronic apparatus is the first mode and the functions unavailable in the second mode are being used by the electronic apparatus.

4. The electronic apparatus according to claim 3, further comprising a display, wherein
the notification unit displays information showing names of functions that are being used among the functions unavailable in the second mode on the display in a case where the present operating mode of the electronic apparatus is the first mode and the functions unavailable in the second mode are being used by the electronic apparatus.

5. The electronic apparatus according to claim 3, further comprising a display, wherein
the notification unit displays information showing names of the functions that are being used and are not being used among the functions unavailable in the second mode on the display in a case where the present operating mode of the electronic apparatus is the first mode and the functions unavailable in the second mode are being used by the electronic apparatus.

6. The electronic apparatus according to claim 3, wherein the control unit performs the switching from the first mode to the second mode according to the instruction from the user after the notification by the notification unit in a case where the present operating mode of the electronic apparatus is the first mode and the functions unavailable in the second mode are not being used by the electronic apparatus.

7. The electronic apparatus according to claim 1, wherein the notification unit notifies the user of the functions unavailable in the second mode according to the reception of the instruction to set the operating mode, in a case where a present operating mode of the electronic apparatus is the first mode, and does not notify the user of the functions unavailable in the second mode even if the instruction to set the operating mode is received from the user, in a case where the present operating mode of the electronic apparatus is the second mode.

8. The electronic apparatus according to claim 1, wherein the notification unit notifies the user of information for making an inquiry about whether to stop using the functions unavailable in the second mode and switch to the second mode in a case where a present operating mode of the electronic apparatus is the first mode and the functions unavailable in the second mode are being used.

9. The electronic apparatus according to claim 8, wherein the control unit stops using the functions unavailable in the second mode and switches the operating mode of the electronic apparatus from the first mode to the second mode according to a reception of an instruction to switch from the first mode to the second mode from the user after the notification of the information about the inquiry by the notification unit.

10. The electronic apparatus according to claim 1, wherein,
in a case where the operating mode of the electronic apparatus is the second mode, the notification unit notifies the user, according to a reception of an instruction to set the functions unavailable in the second mode to be effective from the user, that the functions to be set are unavailable in the second mode.

11. The electronic apparatus according to claim 10, wherein
the notification unit notifies the user of information for confirming whether to switch from the second mode to the first mode to use the functions.

12. The electronic apparatus according to claim 1, further comprising a display, wherein the notification unit displays information showing names of the functions unavailable in the second mode on a display.

13. The electronic apparatus according to claim 1, wherein
the electronic apparatus is a digital camera.

14. A control method for controlling an electronic apparatus, the method comprising:
receiving an instruction from a user;
performing control to set an operating mode of the electronic apparatus to any of a plurality of operating modes including a first mode and a second mode having maximum power consumption lower than maximum power consumption of the first mode according to the instruction from the user, wherein part of a plurality of functions of the electronic apparatus that are available in the first mode are unavailable in the second mode; and
notifying the user of functions unavailable in the second mode among the plurality of functions available in the first mode according to a reception of the instruction to set the operating mode of the electronic apparatus from the user.

15. A non-transitory computer readable medium that stores a program, wherein the program causes a computer to execute a control method of the electronic apparatus, the control method comprising:
receiving an instruction from a user;
performing control to set an operating mode of the electronic apparatus to any of a plurality of operating modes including a first mode and a second mode having maximum power consumption lower than maximum power consumption of the first mode according to the instruction from the user, wherein part of a plurality of functions of the electronic apparatus that are available in the first mode are unavailable in the second mode; and
notifying the user of functions unavailable in the second mode among the plurality of functions available in the first mode according to a reception of the instruction to set the operating mode of the electronic apparatus from the user.

* * * * *